United States Patent
Patnaikuni et al.

(10) Patent No.: US 12,092,465 B2
(45) Date of Patent: Sep. 17, 2024

(54) EVACUATION USING DIGITAL TWINS

(71) Applicant: International Business Machines Corporation, Armonk, NY (US)

(72) Inventors: Subha Kiran Patnaikuni, Visakhapatnam (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/346,509

(22) Filed: Jul. 3, 2023

(65) Prior Publication Data

US 2023/0349700 A1 Nov. 2, 2023

Related U.S. Application Data

(63) Continuation of application No. 17/021,563, filed on Sep. 15, 2020, now Pat. No. 11,747,145.

(51) Int. Cl.
  *G01C 21/20* (2006.01)
  *G06F 30/20* (2020.01)
  *G06N 5/04* (2023.01)

(52) U.S. Cl.
  CPC .......... *G01C 21/206* (2013.01); *G06F 30/20* (2020.01); *G06N 5/04* (2013.01)

(58) Field of Classification Search
  CPC .............. G01C 21/206; G01C 21/3407; G06F 30/20; G06F 30/13; G06F 30/27; G06F 30/28;
  (Continued)

(56) References Cited

U.S. PATENT DOCUMENTS

| | | | |
|---|---|---|---|
| 6,336,594 B1 * | 1/2002 | Bader | F04D 29/601 239/54 |
| 2003/0074917 A1 * | 4/2003 | Kotliar | B01D 53/22 62/640 |
| 2011/0136463 A1 | 6/2011 | Ebdon | |
| 2019/0122509 A1 | 4/2019 | Beller | |

(Continued)

FOREIGN PATENT DOCUMENTS

| | | | | |
|---|---|---|---|---|
| CN | 110716553 A | | 1/2020 | |
| KR | 2020144998 A | * | 12/2020 | G05B 17/02 |

(Continued)

OTHER PUBLICATIONS

"Negative room pressure," Wikipedia, accessed Sep. 11, 2020, 3 pages. <https://en.wikipedia.org/wiki/Negative_room_pressure>.

(Continued)

*Primary Examiner* — James J Yang
(74) *Attorney, Agent, or Firm* — Stosch Sabo

(57) ABSTRACT

A computer system, computer program product, and computer-implemented method are provided for facility evacuation. The method includes determining one or more environmental conditions adverse to one or more occupants within a structure at least partially enclosing a ventilation system and one or more passageways therein. The method also includes predicting movement patterns of the one or more adverse environmental conditions within the at least a portion of the structure. The method further includes creating, through the ventilation system, at least partially subject to the predicting, one or more evacuation routes including at least a first portion of the one or more passageways comprising reducing, at least partially, the one or more adverse environmental conditions within the one or more evacuation routes.

20 Claims, 10 Drawing Sheets

(58) Field of Classification Search
CPC ............. G06F 2113/08; G06F 2113/14; G06N 5/04; G06N 3/006; G06N 3/088
See application file for complete search history.

(56) References Cited

U.S. PATENT DOCUMENTS

| | | | |
|---|---|---|---|
| 2019/0376792 | A1 | 12/2019 | Chen |
| 2022/0082389 | A1 | 3/2022 | Patnaikuni |
| 2022/0197231 | A1* | 6/2022 | Kim .................. G05B 23/0254 |

FOREIGN PATENT DOCUMENTS

| | | | |
|---|---|---|---|
| KR | 20200144998 | A | 12/2020 |
| WO | 2018160961 | A1 | 9/2018 |

OTHER PUBLICATIONS

"Positive Air Pressure Cleanrooms," Clean Air Technology, Inc., accessed Sep. 11, 2011, 1 page. <https://www.cleanairtechnology.com/positive.php>.

"Work safe. Work smart. How IBM TRIRIGA can help." IBM, accessed Sep. 11, 2020, 6 pages. <https://www.IBM.com/products/tririga >.

List of IBM Patents or Patent Applications to be Treated as Related (2023) 2pgs.

Mell et al., "The NIST Definition of Cloud Computing," Recommendations of the National Institute of Standards and Technology, U.S. Department of Commerce, Special Publication 800-145, Sep. 2011, 7 pages.

* cited by examiner

EVACUATION USING DIGITAL TWINS

BACKGROUND

The present disclosure relates to cognitive systems and a digital twin computing system for facility evacuation, and, more specifically, to leveraging a trained cognitive system to automatically facilitate executing an effective evacuation during an emergency through a digital twin of the affected facility's structure and digital twins of the evacuees.

Many known facility structures function as enclosures, such as office buildings, apartment buildings, shopping centers, and industrial facilities. Each of these may have a number of individuals at least temporarily enclosed therein. Under some circumstances, conditions may generate emergency conditions that may require evacuation of the individuals from the affected areas, up to, and including, the entire structure of the facility. During such evacuation, it is possible that a large number of individuals will be leaving the affected areas and seeking haven and shelter elsewhere. Such known enclosures may include features such as visual strobe alarms and pre-recorded evacuation instructions. However, obstacles such as smoke may impair some individuals' abilities to navigate themselves to safety, thereby increasing chaotic conditions in an already chaotic environment.

SUMMARY

A system, computer program product, and method are provided for leveraging a trained cognitive system to automatically facilitate executing an effective evacuation during an emergency through a digital twin of the affected facility structure and digital twins of the evacuees.

In one aspect, a computer system is presented for facility evacuation. The system includes a server including at least one processing device and at least one memory device operably coupled to the at least one processing device. The system also includes a ventilation system communicatively coupled to the serve. The ventilation system and the server are cooperatively configured to determine one or more environmental conditions adverse to one or more occupants within a structure at least partially enclosing a ventilation system and one or more passageways therein. The ventilation system and the server are also cooperatively configured to predict movement patterns of the one or more adverse environmental conditions within at least a portion of the structure. The ventilation system and the server are further cooperatively configured to create, through the ventilation system, at least partially subject to the predicting, one or more evacuation routes including at least a first portion of the one or more passageways comprising reduce, at least partially, the one or more adverse environmental conditions within the one or more evacuation routes.

In another aspect, a computer program product for facility evacuation is presented The computer program product includes one or more computer readable storage media, and program instructions collectively stored on the one or more computer storage media. The product also includes The product further includes program instructions to determine one or more environmental conditions adverse to one or more occupants within a structure at least partially enclosing a ventilation system and one or more passageways therein. The product also includes program instructions to predict movement patterns of the one or more adverse environmental conditions within at least a portion of the structure. The product further includes program instructions to create, through the ventilation system, at least partially subject to the predicting, one or more evacuation routes including at least a first portion of the one or more passageways comprising program instructions to reduce, at least partially, the one or more adverse environmental conditions within the one or more evacuation routes.

In yet another aspect, a computer-implemented method for facility evacuation is presented. The method includes determining one or more environmental conditions adverse to one or more occupants within a structure at least partially enclosing a ventilation system and one or more passageways therein. The method also includes predicting movement patterns of the one or more adverse environmental conditions within the at least a portion of the structure. The method further includes creating, through the ventilation system, at least partially subject to the predicting, one or more evacuation routes including at least a first portion of the one or more passageways comprising reducing, at least partially, the one or more adverse environmental conditions within the one or more evacuation routes.

The present Summary is not intended to illustrate each aspect of, every implementation of, and/or every embodiment of the present disclosure. These and other features and advantages will become apparent from the following detailed description of the present embodiment(s), taken in conjunction with the accompanying drawings.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are illustrative of certain embodiments and do not limit the disclosure.

Figure 1:
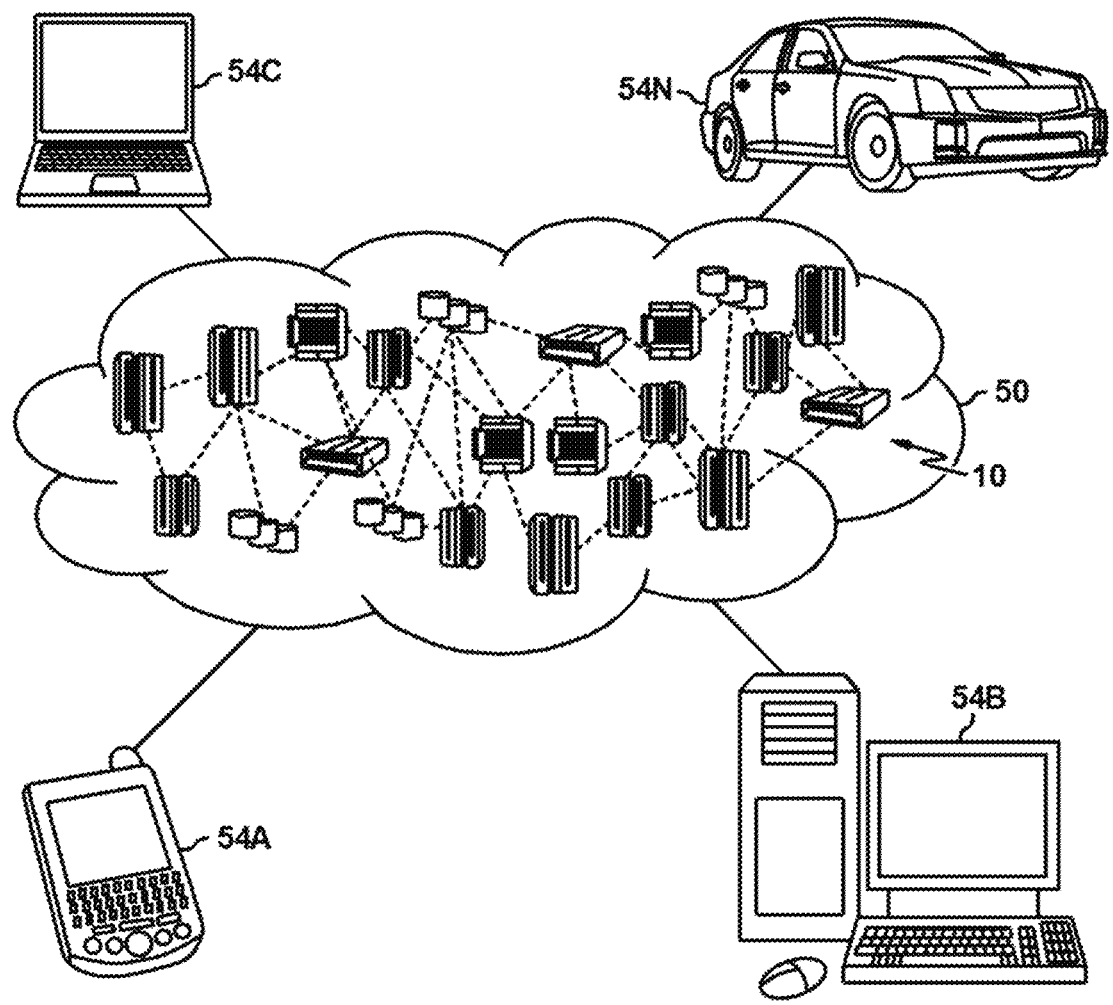
FIG. 1 is a schematic diagram illustrating a cloud computer environment, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

It will be readily understood that the components of the present embodiments, as generally described and illustrated in the Figures herein, may be arranged and designed in a wide variety of different configurations. Thus, the following detailed description of the embodiments of the apparatus, system, method, and computer program product of the present embodiments, as presented in the Figures, is not intended to limit the scope of the embodiments, as claimed, but is merely representative of selected embodiments. In addition, it will be appreciated that, although specific embodiments have been described herein for purposes of illustration, various modifications may be made without departing from the spirit and scope of the embodiments.

Reference throughout this specification to "a select embodiment," "at least one embodiment," "one embodiment," "another embodiment," "other embodiments," or "an embodiment" and similar language means that a particular feature, structure, or characteristic described in connection with the embodiment is included in at least one embodiment. Thus, appearances of the phrases "a select embodiment," "at least one embodiment," "in one embodiment," "another embodiment," "other embodiments," or "an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows.

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows.

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
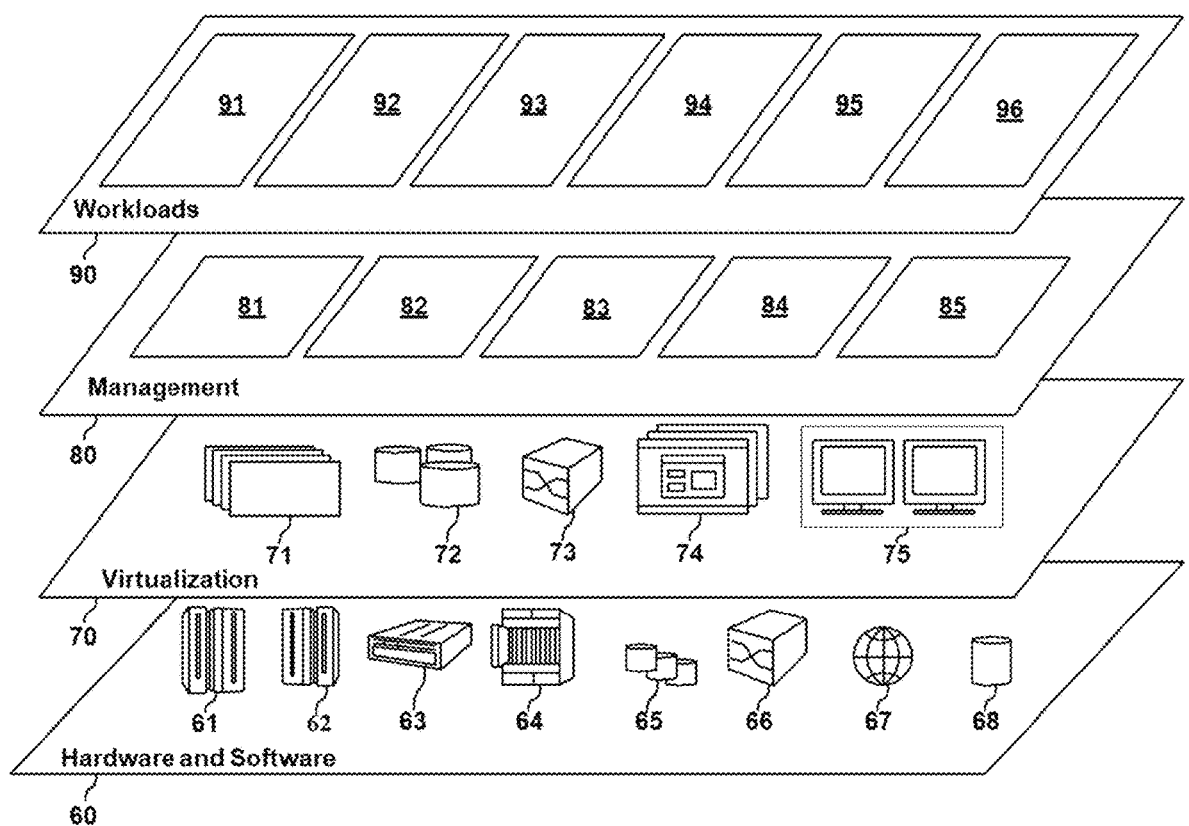
FIG. 2 is a block diagram illustrating a set of functional abstraction model layers provided by the cloud computing environment, in accordance with some embodiments of the present disclosure.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a trained cognitive system 96 to automatically facilitate executing an effective evacuation during an emergency through a digital twin of the affected facility structure and digital twins of the evacuees.

Figure 3:
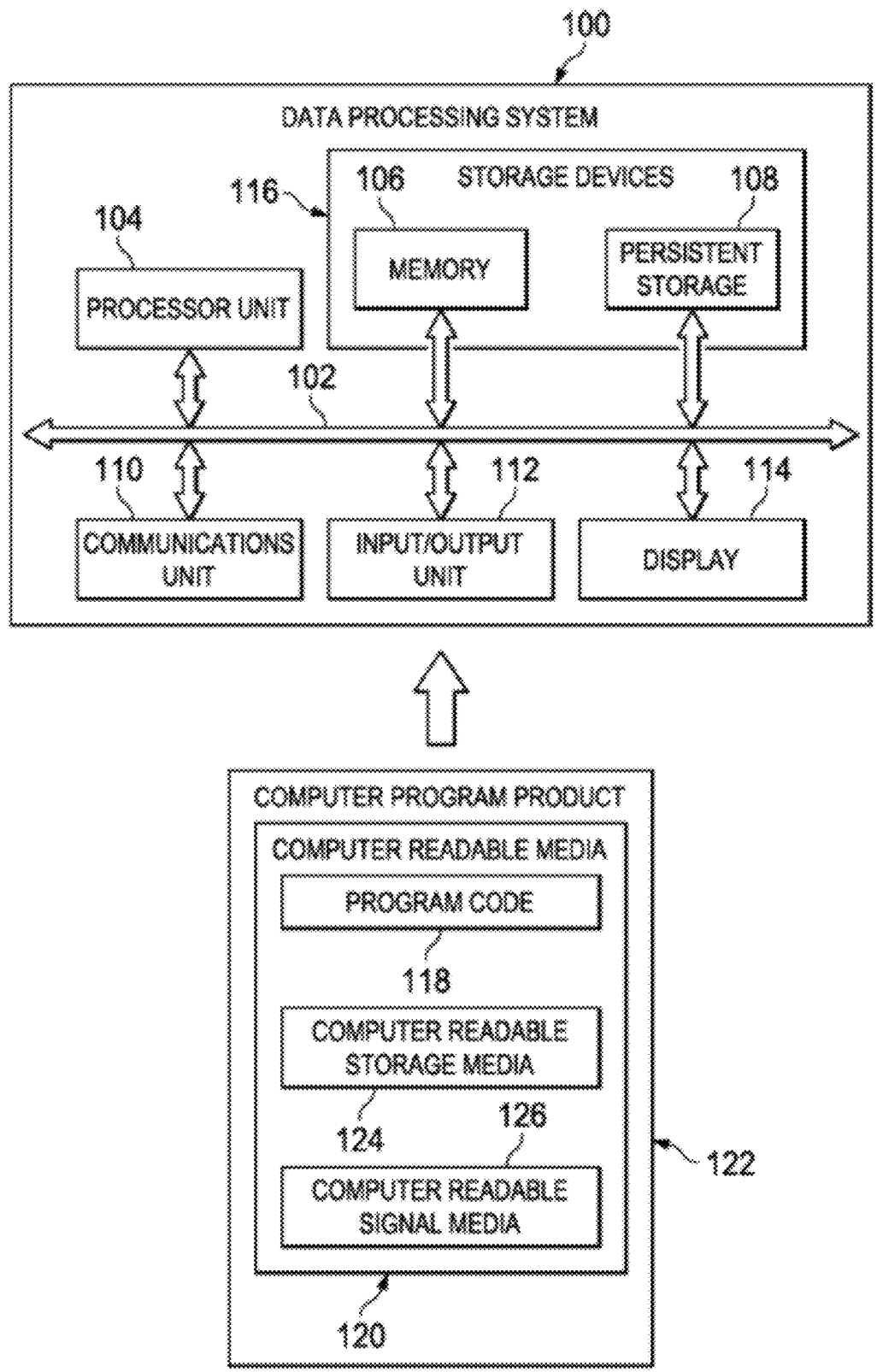
FIG. 3 is a block diagram illustrating a computer system/server that may be used as a cloud-based support system, to implement the processes described herein, in accordance with some embodiments of the present disclosure.

Referring to FIG. 3, a block diagram of an example data processing system, hereon referred to as computer system 100 is provided. System 100 may be embodied in a computer system/server in a single location, or in at least one embodiment, may be configured in a cloud-based system sharing computing resources. For example, and without limitation, the computer system 100 may be used as a cloud computing node 10.

Aspects of the computer system 100 may be embodied in a computer system/server in a single location, or in at least one embodiment, may be configured in a cloud-based system sharing computing resources as a cloud-based support system, to implement the system, tools, and processes described herein. The computer system 100 is operational with numerous other general purpose or special purpose computer system environments or configurations. Examples of well-known computer systems, environments, and/or configurations that may be suitable for use with the computer system 100 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

The computer system 100 may be described in the general context of computer system-executable instructions, such as program modules, being executed by The computer system 100. Generally, program modules may include routines, programs, objects, components, logic, data structures, and so on that perform particular tasks or implement particular abstract data types. The computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, the computer system 100 is shown in the form of a general-purpose computing device. The components of the computer system 100 may include, but are not limited to, one or more processors or processing devices 104 (sometimes referred to as processors and processing units), e.g., hardware processors, a system memory 106, and a communications bus 102 that couples various system components including the system memory 106 to the processing device 104. The communications bus 102 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. The computer system 100 typically includes a variety of computer system readable media. Such media may be any available media that is accessible by the computer system 100 and it includes both volatile and non-volatile media, removable and non-removable media. In addition, the computer system 100 may include one or more persistent storage devices 108, communications units 110, input/output (I/O) units 112, and displays 114.

The processing device 104 serves to execute instructions for software that may be loaded into the system memory 106. The processing device 104 may be a number of processors, a multi-core processor, or some other type of processor, depending on the particular implementation. A number, as used herein with reference to an item, means one or more items. Further, the processing device 104 may be implemented using a number of heterogeneous processor systems in which a main processor is present with secondary processors on a single chip. As another illustrative example, the processing device 104 may be a symmetric multiprocessor system containing multiple processors of the same type.

The system memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The system memory 106, in these examples, may be, for example, a random access memory or any other suitable volatile or non-volatile storage device. The system memory 106 can include computer system readable media in the form of volatile memory, such as random access memory (RAM) and/or cache memory.

The persistent storage 108 may take various forms depending on the particular implementation. For example, the persistent storage 108 may contain one or more components or devices. For example, and without limitation, the persistent storage 108 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the communication bus 102 by one or more data media interfaces.

The communications unit 110 in these examples may provide for communications with other computer systems or devices. In these examples, the communications unit 110 is a network interface card. The communications unit 110 may provide communications through the use of either or both physical and wireless communications links.

The input/output unit 112 may allow for input and output of data with other devices that may be connected to the computer system 100. For example, the input/output unit 112 may provide a connection for user input through a keyboard, a mouse, and/or some other suitable input device. Further, the input/output unit 112 may send output to a printer. The display 114 may provide a mechanism to display information to a user. Examples of the input/output units 112 that facilitate establishing communications between a variety of devices within the computer system 100 include, without limitation, network cards, modems, and input/output interface cards. In addition, the computer system 100 can communicate with one or more networks such as a local area network (LAN), a general wide area network (WAN), and/or a public network (e.g., the Internet) via a network adapter (not shown in FIG. 3). It should be understood that although not shown, other hardware and/or software components could be used in conjunction with the computer system 100. Examples of such components include, but are not limited to: microcode, device drivers, redundant processing units, external disk drive arrays, RAID systems, tape drives, and data archival storage systems.

Instructions for the operating system, applications and/or programs may be located in the storage devices 116, which are in communication with the processing device 104 through the communications bus 102. In these illustrative examples, the instructions are in a functional form on the persistent storage 108. These instructions may be loaded into the system memory 106 for execution by the processing device 104. The processes of the different embodiments may be performed by the processing device 104 using computer implemented instructions, which may be located in a memory, such as the system memory 106. These instructions are referred to as program code, computer usable program code, or computer readable program code that may be read and executed by a processor in the processing device 104. The program code in the different embodiments may be embodied on different physical or tangible computer readable media, such as the system memory 106 or the persistent storage 108.

The program code 118 may be located in a functional form on the computer readable media 120 that is selectively removable and may be loaded onto or transferred to the computer system 100 for execution by the processing device 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the computer system 100. In some instances, the computer readable storage media 124 may not be removable from the computer system 100.

Alternatively, the program code 118 may be transferred to the computer system 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or computer system through the computer readable signal media 126 for use within the computer system 100. For instance, program code stored in a computer readable storage medium in a server computer system may be downloaded over a network from the server to the computer system 100. The computer system providing the program code 118 may be a server computer, a client computer, or some other device capable of storing and transmitting the program code 118.

The program code 118 may include one or more program modules (not shown in FIG. 3) that may be stored in system memory 106 by way of example, and not limitation, as well as an operating system, one or more application programs, other program modules, and program data. Each of the operating systems, one or more application programs, other program modules, and program data or some combination thereof, may include an implementation of a networking environment. The program modules of the program code 118 generally carry out the functions and/or methodologies of embodiments as described herein.

The different components illustrated for the computer system 100 are not meant to provide architectural limitations to the manner in which different embodiments may be implemented. The different illustrative embodiments may be implemented in a computer system including components in addition to or in place of those illustrated for the computer system 100.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Many known structures function as enclosures, such as office buildings, apartment buildings, shopping centers, and industrial facilities, or the like. Such structures may house or otherwise enclose a number of individuals at least temporarily residing within the enclosure defined by the structure. Under some circumstances, conditions may generate emergency conditions that may warrant evacuation of the individuals from the affected areas, up to, and including, the entire facility structure. During such evacuation, it is possible that a large number of individuals will be leaving the affected areas and seeking haven and shelter elsewhere. Such known structures may include features such as visual strobe alarms and pre-recorded evacuation instructions. However, obstacles such as smoke may impair some individuals' abilities to navigate themselves to safety, thereby increasing chaotic conditions in an already chaotic environment.

A system, computer program product, and method are disclosed and described herein for cognitive systems and leveraging a trained cognitive system to automatically facilitate executing an effective evacuation during an emergency through a digital twin of the affected structure and digital twins of the evacuees. In one embodiment, one or more digital twins of the facility, i.e., the structure of the facility is created, where the digital twin is resident within a high-fidelity machine learning (ML) model of the structure. The training of the associated high-fidelity ML model includes ingestion, by the structural model, documents maintained within a knowledge base directed toward the configuration and parameters of the structure that include, without limitation, construction drawings, operation and maintenance manuals, and any other documentation that enables operation of the system through the methods described herein. In particular, configuration data and parameters associated with windows, doors, and passageways (e.g., hallways and/or areas through which humans move when traversing the structure) are ingested. Furthermore, details with respect to those regions of the structure that include potentially hazardous features, for example, and without limitation, glass features, pressurized gas cannisters, electrical switchgear, and chemical storage, are ingested.

In addition, as a portion of the data ingestion by the structural ML model, ventilation system configuration data and parameters are collected and injected into the structural ML model. Such data includes, without limitation, ventilation fan capacities, ventilation duct layouts throughout the structure, and ventilation damper and intake/discharge opening locations in the ducts. Furthermore, the details with respect to the ventilation control systems are ingested, including, without limitation, measurement sensor locations and ranges, and control device locations and ranges, i.e., substantially all input and outputs associated with the ventilation system. Accordingly, the static structural features of the facility are ingested by the ML structural model. Throughout this disclosure fans, ducts, dampers, discharge openings, control systems, and the like are referred to as ventilation fans/ventilation ducts/ventilation dampers/etc. for purposes of discussion. However, one of ordinary skill in the art would understood that this disclosure covers and is consistent with using some and/or all fans/ducts/dampers/etc. that are part of a greater heating, ventilation, and air conditioning (HVAC) system (e.g., rather than just using and covering components that are part of a ventilation aspect of the HVAC system that refreshes and cleans air for the structure), such that general HVAC fans/ducts/dampers/etc. may be used interchangeably with ventilation fans/ventilation ducts/ventilation dampers/etc. as used herein.

In at least some embodiments, the dynamic features of the ventilation system and the structures are recorded and injected into the ML structural model. More specifically, empirical data is recorded by the measurement devices within the structure including one or more environmental measurements representative of one or more environmental conditions within the structure. The data is recorded for a full range of ventilation system configurations, including normal operations and emergency operations. For example, and without limitation, air temperatures, air pressures, and air flow directions and speeds are recorded. Also, for example, atmosphere measurements associated with the movement of test substances that simulate smoke and/or other adverse environmental conditions as circulated by the ventilation system during testing activities are recorded, including, without limitation, adverse environmental material densities and adverse environmental conditions movement directions and speed. In addition, additional capturing of historical air flow patterns inside the structure in different configurations includes, without limitation, varying open/closed window and door configurations to capture changes and differences of external-to-internal and internal-to-external air flows, including dynamic changes as the door and window configurations are changed. Accordingly, the dynamic data associated with the ventilation system and the structure across a wide range of possible conditions is recorded and injected into the structural model.

In at least some embodiments, historical evacuation data and parameters are recorded. For example, the machine learning model captures the details associated with actual emergency evacuations and practice evacuations to determine best practices for future emergency evacuations. Such recorded data includes, without limitation, adverse environmental material densities and adverse environmental conditions movement directions and speeds as a function of the recorded respective ventilation system configurations. Also, without limitation, for the various emergency conditions, the more effective, as well as the less effective, ventilation system configurations are determined. Such configurations include, without limitation, the number of ventilation fans providing forced draft into the structure, the number of ventilation fans providing removal draft from the structure, and ventilation damper positions. In some embodiments, the training of the structural ML model is conducted on a continuous basis as unique conditions are presented. Accordingly, empirical data associated with the performance of the ventilation system during actual and simulated emergencies is recorded and injected into the structural ML model.

In one or more embodiments, the trained high-fidelity structural ML model is placed into production to modulate the ventilation system as a function of the measured conditions, including, without limitation, external environmental (e.g., weather) conditions, and existing and anticipated occupancy of the structure, including a room-by-room and passageway-by-passageway granularity. For example, and without limitation, room sensors may be able to discriminate between those rooms with no occupancy that may require less ventilation than those rooms with full occupancy that may require more ventilation. In some embodiments, the trained high-fidelity structural ML model is placed into production through a digital twin prediction/simulation engine, where the structural digital twin within the structural ML model is placed into production.

In one or more embodiments, in addition to the digital twin of the structure, including the ventilation system, digital twins of the occupants are created by the digital twin prediction/simulation engine. The digital twins of the occupants are resident within the respective high-fidelity occupant ML models, and, in some embodiments, each occupant in the structure has a corresponding digital twin. Each occupant ML model is trained with data that includes, without limitation, historical occupant biometric and health data and the associated parameters for each respective occupant. Such physical health conditions data includes, without limitation, pregnancy, pacemakers, and advanced age, and mobility issues such as knee issues and wheelchair/walker/crutch requirements. In addition, the historical behavioral patterns of each respective occupant is ingested by the respective occupant ML models. Such behavioral parameters include, without limitation, anxiety levels, and susceptibility to panic attacks. Sources for the behavioral parameters include, without limitation, professional evaluations and social media. The data used to generate the digital twins for the occupants will meet or exceed all respective privacy and confidentially laws and requirements. In addition to the individual occupants' health and mobility parameters, the number of occupants and their respective positions within the structure are maintained in real-time, as well as behaviorally through determined routines for each respective occupant. In a manner similar to that for the structural digital twin, the occupant digital twins are placed into production and managed through the digital twin prediction/simulation engine. Accordingly, for each occupant, a respective digital twin is generated by the digital twin prediction/simulation engine such that the occupants are simulated within the model, including a simulated individualized occupant evacuation plan, taking into account the occupants' present location, their respective medical and behavioral conditions, and distribution of the occupants to be evacuated to provide a safe, efficient, and effective evacuation.

In at least some embodiments, and as described above, measurement data indicative of the environmental conditions within and throughout the structure is continuously collected. Mechanisms for collecting the real time data of the environmental conditions within the structure include, without limitation, installed sensors such as, and without limitation, pressure sensors, temperature sensors, flow sensors, infrared sensors, cameras, smoke detectors, and carbon monoxide detectors. The aforementioned sensors may be any combination of wired and wireless devices. In addition, such sensors may include Internet of Things (IoT) devices, such as, and without limitation, mobile phones, portable sensors, and position monitoring devices borne by the occupants. Furthermore, activation of automatic sprinkler systems may be used to identify the nature and location of the hazardous conditions, including the magnitude and rate of growth or containment of the hazard.

The digital twin prediction/simulation engine is trained to determine measurements that may be indicative of an incipient hazardous condition developing in real time. Many of the embodiments of the systems described herein include structural ML models and structural digital twins with ventilation details to predict one or more environmental conditions adverse to one or more occupants within the structure. In some embodiments, such predicting activities include tracking the airflow movement direction inside the building, and utilizing the knowledge the model was trained with, to predict how hazardous conditions, such as, without limitation, smoke, will be flowing. Specifically, the direction of smoke movement inside the building, and how the current environmental parameters inside the building is influencing the flow and direction of spread of smoke, are analyzed. In addition, the relative positioning and the nature of the emergency conditions within the structure causing the hazardous environment may be determined, e.g., without limitation, fire in a particular room. Furthermore, the type and severity of the emergency conditions may be established.

In some embodiments, the accumulated knowledge, both historical and real time, may indicate to the digital twin prediction/simulation engine a need to evacuate at least a portion of the occupants within the structure. Therefore, the model may determine, subject to the one or more adverse environmental conditions determination, one or more evacuation routes through the structure, including at least a first portion of the one or more passageways therein. In some embodiments, the evacuation routes may be created, at least partially subject to the prediction and simulation, through the digital twin prediction/simulation engine operating in conjunction with the ventilation system. In some embodiments, the digital twin prediction/simulation engine operating in conjunction with the ventilation system will maintain established evacuation routes. Moreover, in some embodiments, these two features may overlap.

In one or more embodiments, at least partially creating the one or more evacuation routes includes modulating one or more ventilation devices and inducing, subject to the ventilation devices' modulation, atmosphere pressure modulations within the one or more passageways, and in some cases, one or more rooms or enclosures within the structure. The modulations of the pressures throughout the various enclosures and passageways in the structure give rise to controlling the wind or air flows therein. Therefore, the digital twin prediction/simulation engine and the ventilation system include the capabilities to dynamically control the direction of flow of smoke and breathable air to alter the air flow direction with positive and negative pressure gradients. Such dynamic flow control is at least partially based on recording, through one or more atmosphere pressure measurement devices, real time ventilation measurement data; recording one or more real time atmosphere pressures; recording one or more real time atmosphere temperatures; recording one or more real time adverse environmental material densities; and recording one or more real time adverse environmental conditions movement directions and speed. Based on the historical and real time measurements, the digital twin of the structure, including the ventilation system, will be predicting smoke movement patterns inside the building and will predict one or more effective evacuation paths through the digital twin simulation features. In addition to the smoke movement and evacuation predictions, the structural digital twin predicts those actions that may be used to identify how the smoke can be redirected through operation of the ventilation system, or any other robotic or automation mechanisms that may be applied which can redirect the airflow, as well as human intervention if necessary. The evacuation routes will be communicated to the respective occupants. The simulation will determine those exits that are, and are not, safe for evacuations.

In at least some embodiments, subject to the evacuation route predictions, the structural digital twin will regulate the ventilation system to modulate atmosphere pressures within the evacuation routes and non-evacuation regions. For example, and without limitation, the pressures in the evacuation routes may be increased and the pressures in the non-evacuation regions may be decreased to induce the smoke to flow toward the non-evacuation regions from the evacuation routes. As the ventilation system begins to alter the smoke flow patterns in the structure, the real time data as described above continues to be received by the digital twin prediction/simulation engine and the predicted adverse environmental conditions movement patterns within the affected portions of the structure are modified based on the incoming data. In addition, subject to the modified predictions of the predicted adverse environmental conditions movement patterns, the simulation of the adverse environmental conditions movement within the affected portions of the structure are modified. Accordingly, as the simulation is modified, the ventilation system is operated to modulate the atmosphere pressures in one or more respective passageways to move at least a portion of the adverse environmental conditions from the evacuation routes to the non-evacuation regions. Accordingly, real time ventilation measurement data, ventilation system configuration data, and the respective modified parameters are used to simulate and execute an evacuation plan.

In one or more embodiments, subject to the evacuation routes being determined and efforts towards clearing the evacuation routes of the adverse environmental conditions are initiated, such conditions facilitate an evacuation of the occupants from an affected portion of the structure. The high-fidelity occupant ML models, i.e., the digital twins of the occupants, receive real time occupant biometric and health data and parameters, thereby each digital twin of each respective occupant is identified. Based on the nature of the adverse environmental conditions, and the historical data and parameters of the occupants used to train the respective digital twins, for each digital twin, respective physical difficulties that are predicted for the evacuation are simulated. Such simulated physical difficulties may include one or more of discomfort during movement, or inability to walk or run, low speed of movement, and necessity for assistance with a wheelchair. In addition, for each respective digital twin, an evacuation plan is dynamically simulated. The simulated evacuation plan is based on the individualized evacuation plan for each respective digital twin, where the evacuation routes are dynamically assigned to the respective digital twins, thereby efficiently and effectively orchestrating the evacuation to avoid overcrowding of any of the evacuation routes.

The simulated evacuation plan is at least partially further based on a simulated population capacity of each evacuation route, the predicted populations and population densities at each emergency exit, predicted changes in populations at each emergency exit and along the evacuation routes as a function of real time feedback of the number of occupants in transit. In addition, the simulated evacuation plan may be at least partially further based on the changes in the emergency conditions, the period of time estimated for each in transit occupant to arrive at each respective emergency exit based on their measured rate of progress through the evacuation route and known medical infirmities, actual real time changes in populations in the evacuation routes and at each emergency exit through feedback from an arrival at each emergency exit of the in transit occupants, and/or real-time changes to the number of in transit occupants within the evacuation routes directed toward the respective emergency exits. Accordingly, real time evacuation data and respective parameters and real time occupant data and parameters are used to orchestrate the evacuation.

To facilitate the evacuation, each individual occupant receives personalized guidance with virtual assistance, including, without limitation, voice instructions through a speaker system of a portable device, such as a mobile phone, subject to the limitations of the respective occupants. As the occupants are observed traversing the assigned evacuation routes, through the aforementioned tracking and sensing devices, real time evacuation data and parameters are received by the respective digital twins. Such real time feedback of the occupants, the emergency conditions, and the ventilation system results in dynamically modifying the respective evacuation routes for at least a portion of the digital twins if necessary. The simulation of the ventilation system will also be updated as the evacuation progresses, and the feedback from the ventilation system devices will be used to simulate the updating of the digital twins of the occupants. Accordingly, the evacuation will continue to be predicted and simulated through the structural ML digital twin and the occupants' ML digital twins.

Artificial Intelligence (AI) is one example of cognitive systems that relate to the field of computer science directed at computers and computer behavior as related to humans and man-made and natural systems. Cognitive computing utilizes self-teaching algorithms that use, for example, and without limitation, data analysis, visual recognition, behavioral monitoring, and natural language processing (NLP) to solve problems and optimize human processes. The data analysis and behavioral monitoring features analyze the collected relevant data and behaviors as subject matter data as received from the sources as discussed herein. As the subject matter data is received, organized, and stored, the data analysis and behavioral monitoring features analyze the data and behaviors to determine the relevant details through computational analytical tools which allow the associated systems to learn, analyze, and understand human behavior, including within the context of the present disclosure. With such an understanding, the AI can surface concepts and categories, and apply the acquired knowledge to teach the AI platform the relevant portions of the received data and behaviors. In addition to analyzing human behaviors and data, the AI platform may also be taught to analyze data and behaviors of man-made and natural systems.

In addition, cognitive systems such as AI, based on information, are able to make decisions, which maximizes the chance of success in a given topic. More specifically, AI is able to learn from a dataset, including behavioral data, to solve problems and provide relevant recommendations. For example, in the field of artificial intelligent computer systems, machine learning (ML) systems process large volumes of data, seemingly related or unrelated, where the ML systems may be trained with data derived from a database or corpus of knowledge, as well as recorded behavioral data. The ML systems look for, and determine, patterns, or lack thereof, in the data, "learn" from the patterns in the data, and ultimately accomplish tasks without being given specific instructions. In addition, the ML systems, utilizes algorithms, represented as machine processable models, to learn from the data and create foresights based on this data. More specifically, ML is the application of AI, such as, and without limitation, through creation of neural networks that can demonstrate learning behavior by performing tasks that are not explicitly programmed. Deep learning is a type of neural-network ML in which systems can accomplish complex tasks by using multiple layers of choices based on output of a previous layer, creating increasingly smarter and more abstract conclusions.

ML learning systems may have different "learning styles." One such learning style is supervised learning, where the data is labeled to train the ML system through telling the ML system what the key characteristics of a thing are with respect to its features, and what that thing actually is. If the thing is an object or a condition, the training process is called classification. Supervised learning includes determining a difference between generated predictions of the classification labels and the actual labels, and then minimize that difference. If the thing is a number, the training process is called regression. Accordingly, supervised learning specializes in predicting the future.

A second learning style is unsupervised learning, where commonalities and patterns in the input data are determined by the ML system through little to no assistance by humans. Most unsupervised learning focuses on clustering, i.e., grouping the data by some set of characteristics or features. These may be the same features used in supervised learning, although unsupervised learning typically does not use labeled data. Accordingly, unsupervised learning may be used to find outliers and anomalies in a dataset, and cluster the data into several categories based on the discovered features.

Semi-supervised learning is a hybrid of supervised and unsupervised learning that includes using labeled as well as unlabeled data to perform certain learning tasks. Semi-supervised learning permits harnessing the large amounts of unlabeled data available in many use cases in combination with typically smaller sets of labelled data. Semi-supervised classification methods are particularly relevant to scenarios where labelled data is scarce. In those cases, it may be difficult to construct a reliable classifier through either supervised or unsupervised training. This situation occurs in application domains where labelled data is expensive or difficult obtain, like computer-aided diagnosis, drug discovery and part-of-speech tagging. If sufficient unlabeled data is available and under certain assumptions about the distribution of the data, the unlabeled data can help in the construction of a better classifier through classifying unlabeled data as accurately as possible based on the documents that are already labeled.

The third learning style is reinforcement learning, where positive behavior is "rewarded: and negative behavior is "punished." Reinforcement learning uses an "agent," the agent's environment, a way for the agent to interact with the environment, and a way for the agent to receive feedback with respect to its actions within the environment. An agent may be anything that can perceive its environment through sensors and act upon that environment through actuators. Therefore, reinforcement learning rewards or punishes the ML system agent to teach the ML system how to most appropriately respond to certain stimuli or environments. Accordingly, over time, this behavior reinforcement facilitates determining the optimal behavior for a particular environment or situation.

Deep learning is a method of machine learning that incorporates neural networks in successive layers to learn from data in an iterative manner. Neural networks are models of the way the nervous system operates. Basic units are referred to as neurons, which are typically organized into layers. The neural network works by simulating a large number of interconnected processing devices that resemble abstract versions of neurons. There are typically three parts in a neural network, including an input layer, with units representing input fields, one or more hidden layers, and an output layer, with a unit or units representing target field(s). The units are connected with varying connection strengths or weights. Input data are presented to the first layer, and values are propagated from each neuron to every neuron in the next layer. At a basic level, each layer of the neural network includes one or more operators or functions operatively coupled to output and input. Output from the operator(s) or function(s) of the last hidden layer is referred to herein as activations. Eventually, a result is delivered from the output layers. Deep learning complex neural networks are designed to emulate how the human brain works, so computers can be trained to support poorly defined abstractions and problems. Therefore, deep learning is used to predict an output given a set of inputs, and either supervised learning or unsupervised learning can be used to facilitate such results.

Figure 4:
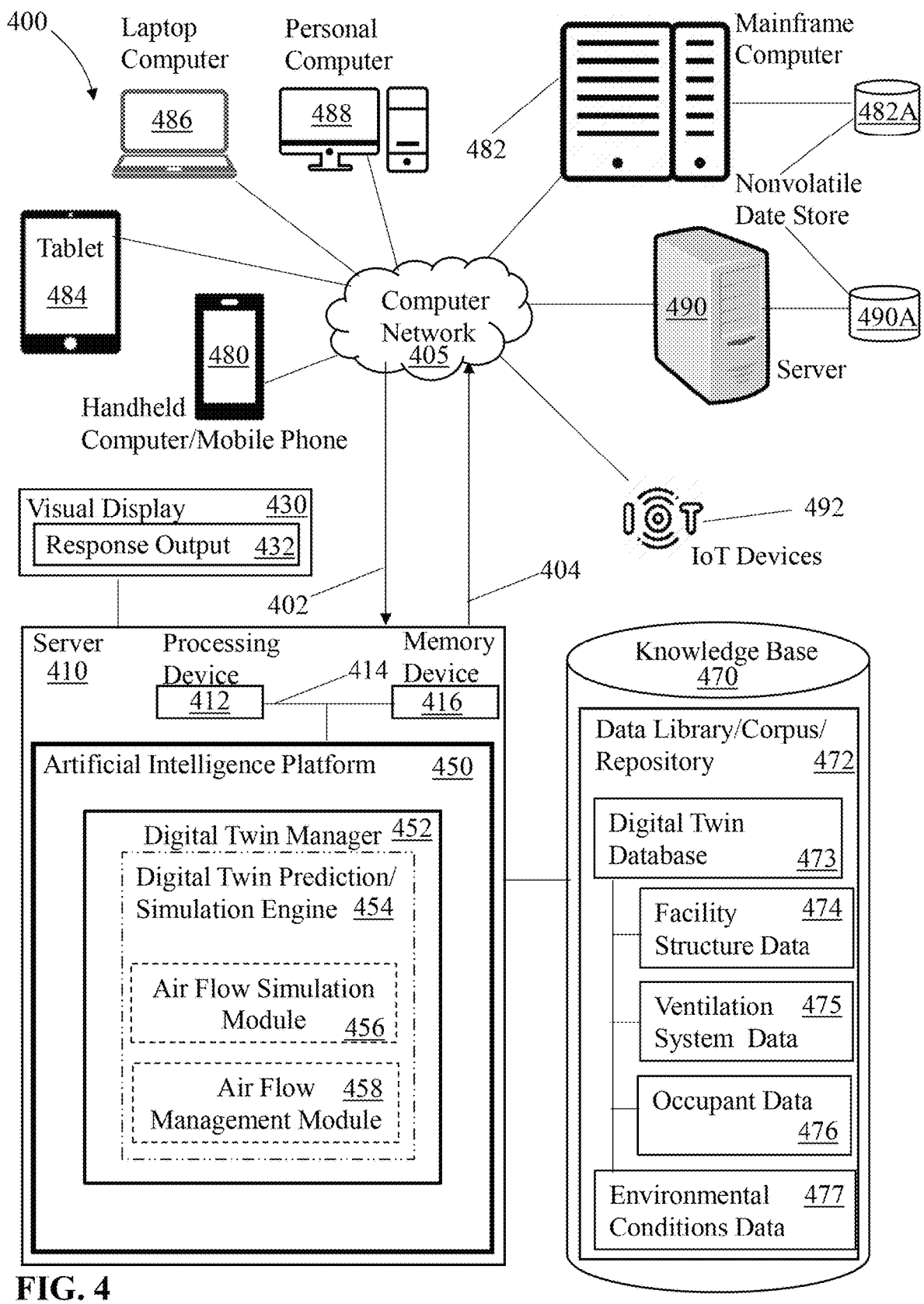
FIG. 4 is a schematic diagram illustrating a computer system including an artificial intelligence platform suitable for leveraging a trained cognitive system to automatically facilitate executing an effective evacuation during an emergency through a digital twin of the affected facility structure and digital twins of the evacuees, in accordance with some embodiments of the present disclosure.

Referring to FIG. 4, a schematic diagram is provided illustrating a computer system 400, that in the embodiments described herein, is a digital twin computing system 400 for structure evacuation. In at least one embodiments, the digital twin computing system 400 includes one or more automated machine learning (ML) system features to leverage a trained cognitive system to automatically execute an effective evacuation during an emergency through a digital twin of the affected structure and digital twins of the evacuees. In at least one embodiment, the digital twin computing system 400 is embodied as a cognitive system, i.e., an artificial intelligence (AI) platform computing system that includes an artificial intelligence platform 450 suitable for establishing the aforementioned digital twins to facilitate the evacuation activities.

As shown, a server 410 is provided in communication with a plurality of computing devices 480, 482, 484, 486, 488, 490, and 492 across a computer network connection 405. The computer network connection 405 may include several information handling devices. Types of information handling devices that can utilize the digital twin computing system 400 range from small handheld devices, such as a handheld computer/mobile telephone 480 to large mainframe systems, such as a mainframe computer 482. Examples of information handling systems includes, personal digital assistants (PDAs), personal entertainment devices, pen or tablet computer 484, laptop or notebook computer 486, personal computer system 488, server 490, and one or more Internet of Things (IoT) devices 192, that in at least some embodiments, include connected cameras and environmental sensors. As shown, the various information handling systems can be networked together using the computer network connection 405.

Various types of a computer networks can be used to interconnect the various information handling systems, including Local Area Networks (LANs), Wireless Local Area Networks (WLANs), the Internet, the Public Switched Telephone Network (PSTN), other wireless networks, and any other network topology that can be used to interconnect information handling systems and computing devices as described herein. Many of the information handling systems include non-volatile data stores, such as hard drives and/or non-volatile memory. Some of the information handling systems may use separate non-volatile data stores, e.g., server 490 utilizes non-volatile data store 490a, and mainframe computer 482 utilizes non-volatile data store 482a. The non-volatile data store 482a can be a component that is external to the various information handling systems or can be internal to one of the information handling systems.

The server 410 is configured with a processing device 412 in communication with memory device 416 across a bus 414. The server 410 is shown with the artificial intelligence (AI) platform 450 for cognitive computing, including machine learning, over the computer network connection 405 from one or more of the computing devices 480, 482, 484, 486, 488, 490, and 492. More specifically, the computing devices 480, 482, 484, 486, 488, 490, and 492 communicate with each other and with other devices or components via one or more wired and/or wireless data communication links, where each communication link may comprise one or more of wires, routers, switches, transmitters, receivers, or the like. In this networked arrangement, the server 410 and the computer network connection 405 enable communication, detection, recognition, and resolution. The server 410 is in operable communication with the computer network through communications links 402 and 404. Links 402 and 404 may be wired or wireless. Other embodiments of the server 410 may be used with components, systems, sub-systems, and/or devices other than those that are depicted herein.

The AI platform 450 is shown herein configured with tools to enable structure evacuation. More specifically, the AI platform 450 is configured for leveraging a trained cognitive system to automatically facilitate executing an effective evacuation during an emergency through a digital twin of the affected structure and digital twins of the evacuees. In one embodiment, one or more digital twins of the structure, i.e., the structure of the facility is created, where the digital twin is resident within a high-fidelity machine learning (ML) model of the structure. In addition, as a portion of data ingestion by the structural model, ventilation system configuration data and parameters are collected and injected into the structural model. Moreover, in addition to the digital twin of the structure, including the ventilation system, digital twins of the occupants are created. The digital twins of the occupants are resident within the respective high-fidelity occupant ML models, and, in some embodiments, each occupant in the structure has a corresponding digital twin. Accordingly, the AI platform 450 includes a learning-based mechanism that can facilitate creation of digital twins of the structure of a facility and digital twins of the occupants thereof to facilitate an effective emergency evacuation.

The tools shown herein include, but are not limited to, a digital twin manager 452 including a digital twin prediction/simulation engine 454 with an air flow simulation module 456 and an air flow management module 458 embedded therein. The digital twin manager 452, digital twin prediction/simulation engine 454, air flow simulation module 456, and air flow management module 458 are described further herein with respect to FIGS. 5-9.

The AI platform 450 may receive input from the computer network connection 405 and leverage a knowledge base 470, also referred to herein as a data source, to selectively access training and other data. The knowledge base 470 is provided operably coupled to the server 410 including the processing device 412 and/or memory 416. In at least one embodiment, the knowledge base 470 may be directly operably coupled to the server 410. In some embodiments, the knowledge base 470 is communicatively coupled to the server 410 across the computer network connection 405. In at least one embodiment, the knowledge base 470 includes a data repository 472, sometimes referred to as a data library 472, or knowledge corpus 472, that may be in the form of one or more databases. The data repository 472 includes different databases, including, but not limited to, a digital twin database 473 that includes facility structure data 474, ventilation system data 475, occupant data 476, and environmental conditions data 477 where the digital twin database 473 and the resident data therein are described further herein. Accordingly, the server 410 including the AI platform 450, digital twin manager 452 receive information from the computer network connection 405 and the devices connected thereto, and the knowledge base 470.

In at least some embodiments, the digital twin database 473 includes the full inventory of available data tables i.e., datasets, available to execute the operations as described herein through the digital twin manager 452 and directed towards building and dynamically updating the digital twin of the facility's structure, including the ventilation system, and digital twins of the occupants therein that will require evacuation from the structure, etc. In one or more embodiments, the data tables include a variety of subject matter embedded therein, where the data resident within the knowledge base 170 is described in more detail herein. Similarly, the digital twins database 473 include the machine learning models generated by the digital twin manager 452 as described further herein. Accordingly, the datasets and the models generated therefrom are collected, generated, and managed within their respective databases 473 through 477 by the digital twin manager 452.

A response output 432 includes, for example, and without limitation, output generated in response to a query of the data repository 472 that may include some combination of the datasets resident therein. Further details of the information displayed is described with respect to FIGS. 6-9.

In at least one embodiment, the response output 432 is communicated to a corresponding network device, shown herein as a visual display 430, operatively coupled to the server 410 or in at least one other embodiment, operatively coupled to one or more of the computing devices 480-492 across the computer network connection 405.

The computer network connection 405 may include local network connections and remote connections in various embodiments, such that the artificial intelligence platform 450 may operate in environments of any size, including local and global, e.g., the Internet. Additionally, the AI platform 450 serves as a front-end system that can make available a variety of knowledge extracted from or represented in network accessible sources and/or structured data sources. In this manner, some processes populate the AI platform 450, with the AI platform 450 also including one or more input interfaces or portals to receive requests and respond accordingly.

Figure 5:
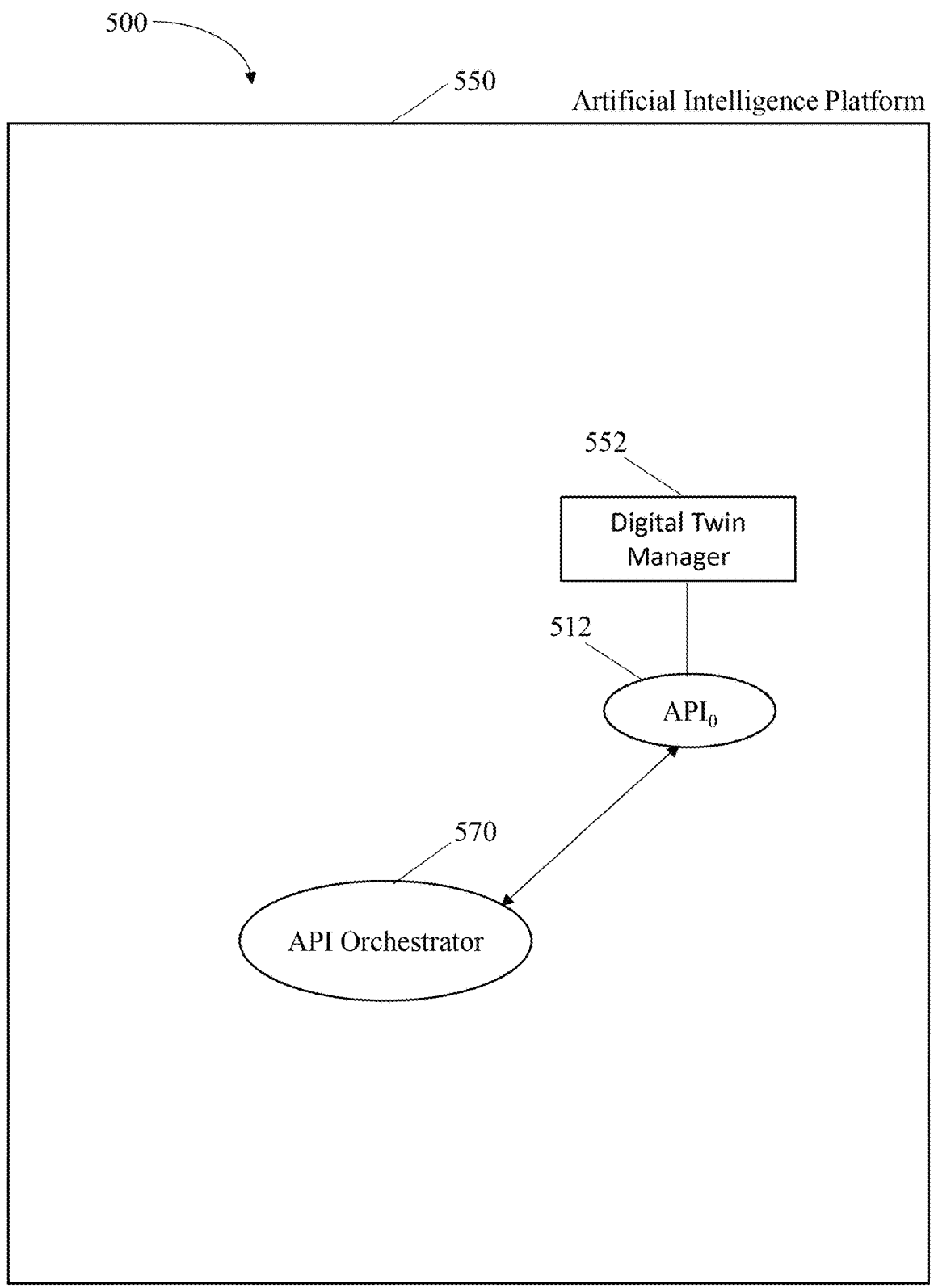
FIG. 5 is a block diagram illustrating artificial intelligence platform tools, as shown and described in FIG. 4, and their associated application program interfaces, in accordance with some embodiments of the present disclosure.

An Application Program Interface (API) is understood in the art as a software intermediary, e.g., invocation protocol, between two or more applications which may run on one or more computing environments. With respect to the AI platform 450 shown and described in FIG. 4, one or more APIs may be utilized to support one or more of the tools therein, including the digital twin manager 452 and its associated functionality. Referring to FIG. 5, a block diagram 500 is provided illustrating the tool, i.e., the digital twin manager 552 and its associated API. As shown, a tool is embedded within the AI platform 550, that is equivalent to the AI platform 450 (shown in FIG. 4). The AI platform 550 includes the tool including, but not limited to, the digital twin manager 452 (shown herein as 452) associated with $API_O$ 512.

The $API_O$ 512 may be implemented in one or more languages and interface specifications. $API_O$ 512 provides functional support for, without limitation, the digital twin manager 552 that is configured to facilitate execution of one or more operations by the server 410. Such operations include, without limitation, collecting, storing, and recalling the data stored within the digital twin database 473 as discussed herein, and providing data management and transmission features not provided by any other managers or tools (not shown). Accordingly, the digital twin manager 552 is configured to facilitate building, storing, and managing the data in the digital twin database 473 including, without limitation, joining of the data resident therein.

In at least some embodiments, the digital twin prediction/simulation engine 454 and the functionality thereof is implemented through the $API_O$ 512. In addition, and more specifically, in some embodiments the $API_O$ 512 provides functional support for, without limitation, generating, within a respective high-fidelity machine learning (ML) model, a digital twin of the structure, including the ventilation system, of the respective facility and digital twins of the occupants thereof. Moreover, the $API_O$ 512 provides functional support for, without limitation, the training of the associated high-fidelity ML model including ingestion, of the available data with respect to the structure, including the ventilation system, and the occupants, where the data may be static and dynamic. Furthermore, the $API_O$ 512 provides functional support for, without limitation, generating a simulated individualized occupant evacuation plan, taking into account the occupants' present location, their respective medical and behavioral conditions, and distribution of the occupants to be evacuated to provide a safe, efficient, and effective evacuation, where the $API_O$ predicts medical conditions that may be manifested as a hinderance during an evacuation. Also, the $API_O$ 512 provides functional support for, without limitation, determining hazard conditions and the most effective evacuation routes. In addition, the $API_O$ 512 provides functional support for, without limitation, at least partially creating the evacuation routes through modulating one or more ventilation devices and inducing, subject to the ventilation devices' modulation, atmosphere pressure modulations within the evacuation routes to mitigate the presence of hazardous conditions, e.g., smoke. Moreover, the $API_O$ 512 provides functional support for, without limitation, dynamically modifying the evacuation routes through one or more of localized draft control and personalized evacuation directions to the occupants', thereby actively orchestrating the evacuation.

Figure 6:
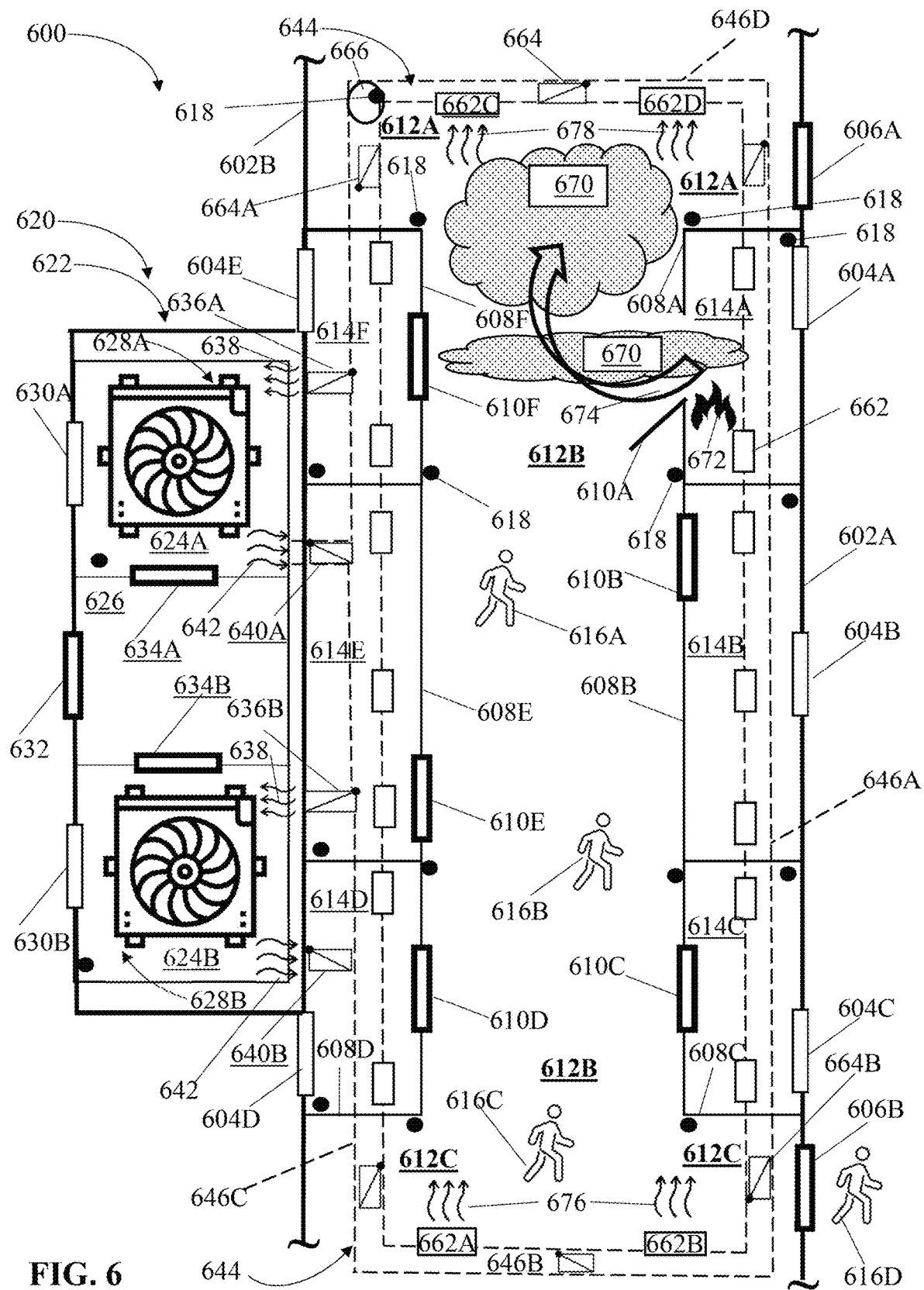
FIG. 6 is a schematic diagram illustrating a structure and the associated ventilation system, in accordance with some embodiments of the present disclosure.

Referring to FIG. 6, a schematic diagram is provided illustrating a facility structure 600, hereon structure 600, and the associated ventilation system 620. In one or more embodiments, the structure 600 includes a plurality of exterior walls 602A and 602B. The exterior walls have windows 604A, 604B, 604C, 604D, and 604E and exterior doors 606A and 606B. The structure 600 also includes a plurality of interior walls 608A, 608B, 608C, 608D, 608E, and 608F, that define respective interior doors 610A, 610B, 610C, 610D, 610E, and 610F, respectively. The interiors walls 608A-F define a plurality of passageways 612A, 612B, and 612C. The interior walls 608A-F and the exterior walls define respective interior rooms 614A, 614B, 614C, 614D, 614E, and 614F. A plurality of occupants 616A, 616B, 616C, and 616D are shown in FIG. 6. Moreover, the structure 600 includes a plurality of monitoring sensor devices 618, where for clarity, not all monitoring sensor devices 618 are labeled. The structure 600 as depicted in FIG. 6 and described herein is to illustrate the principles of operation of the digital twin computing system 400 and methods 800 and 900 as also described herein. The floors and ceilings/roof are not shown for clarity. In some embodiments, the structures are multi-story, and possibly including below grade levels. In such embodiments, the respective structures may have elevator, escalators, and stairs for inter-level transit by the occupants 616A-616D. Accordingly, the system and methods as described herein are extendable and adaptable to enable operation as described herein for any structural configurations of any facilities.

In one or more embodiments, the ventilation system 620 includes a ventilation fan room 622 directly adjacent to the exterior wall 602B. In some embodiments, the ventilation fan room 622 is positioned in a below-grade level, on the roof, or in a room within the exterior walls 602A and 602B. In at least one embodiment, the ventilation fan room 622 includes two separate fan compartments 624A and 624B and a vestibule 626 therebetween, where the number of fan compartments is not limiting. Each of compartments 624A and 624B includes one ventilation fan 628A and 628B, respectively, where the number of fans in each compartment, and the number of fans in the ventilation fan room 622, are non-limiting. The ventilation fans 628A and 628B are any fans with any auxiliary equipment that enable operation of the digital twin computing system 400 as described herein, including, without limitation, external ventilation fan inlet dampers 630A and 630B, variable speed drives (not shown) and translatable inlet vanes (not shown). In some embodiments, the fan inlet dampers 630A and 630B are variable position devices and in some embodiments the fan inlet dampers 630A and 630B are either discreetly fully open or fully closed. The vestibule 626 includes an exterior door 632 and each compartment 624A and 624B includes a respective door 634A and 634B.

In addition, in at least some embodiments, the ventilation system 620 includes a ventilation fan inlet damper 636A and 636B for each respective ventilation fan 628A and 628B to induce an inlet draft 638 into each respective ventilation fan compartment 624A and 624B. The ventilation system 620 also includes a ventilation fan supply damper 640A and 640B for each respective ventilation fan 628A and 628B to induce a supply draft 642 into a ventilation duct system 644. The ventilation duct system 644 includes ventilation ducts 646A, 646B, 646C, and 646D that each include one or more intake/discharge openings 662 and one or more duct flow control dampers 664. In some embodiments, the intake/discharge openings 662 include static gratings and in some embodiments, they have variable vanes for dynamic flow control therethrough. In some embodiments, the duct flow control dampers 664 are modulated to regulate air flow in the associated duct. For the purposes of clarity, i.e., not showing both supply and return ducts, the direction of orientation of the duct flow control dampers 664 is not relevant, unless otherwise stated herein. In some embodiments, the ventilation system 620 further includes at least one exhaust conduit 666 coupled in flow communication with ventilation ducts, 646C and 646D. In some embodiments, the exhaust conduit 666 exhausts to the roof of the structure 600, and in some embodiments, the exhaust conduit 666 exhausts anyplace that enables operation of the ventilation system 620 as described herein. Also, in some embodiments, the exhaust conduit 666 includes one or more monitoring sensor devices 618.

Figure 7:
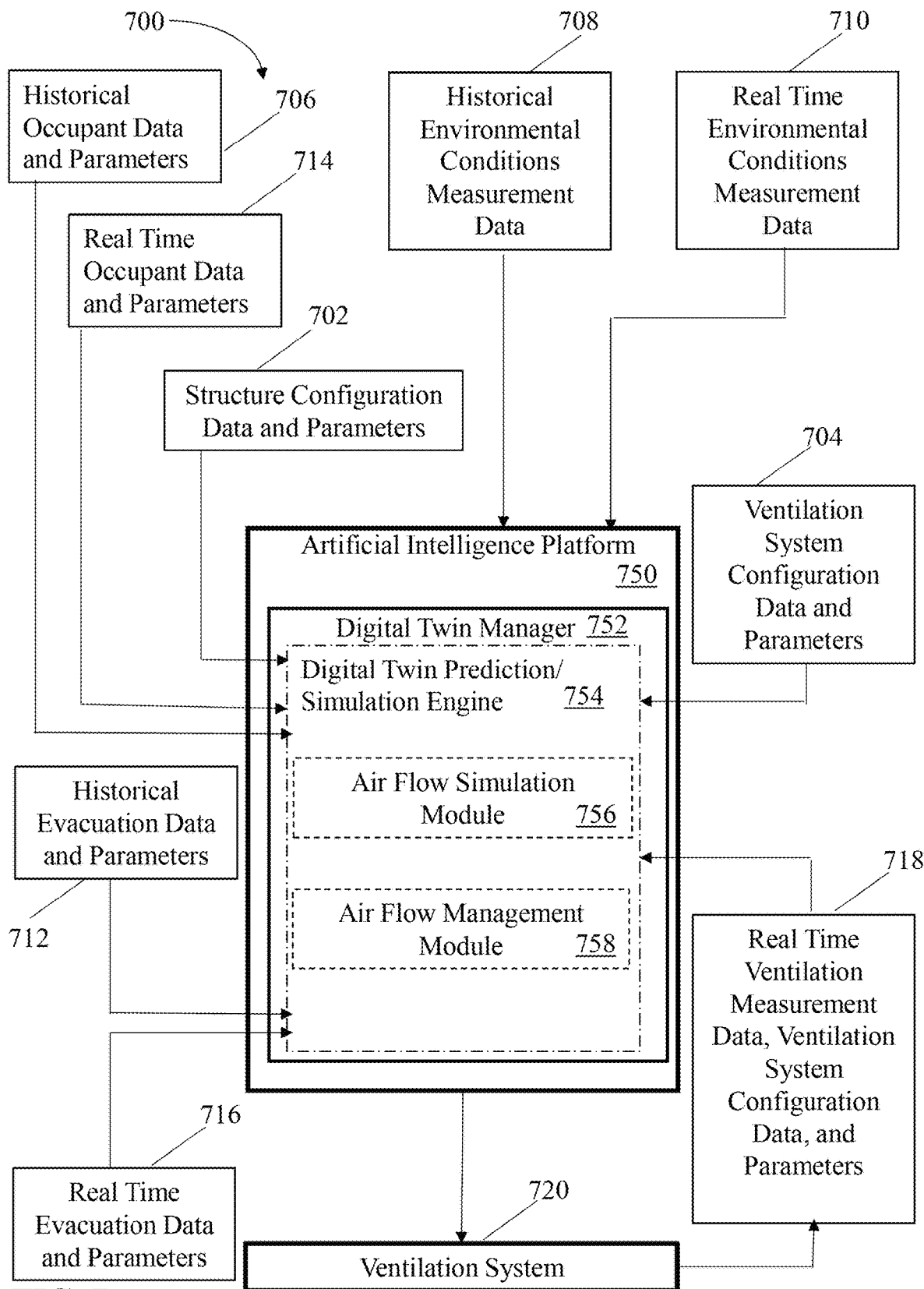
FIG. 7 is a schematic diagram illustrating a cooperative relationship between the artificial intelligence platform of FIG. 4 and the ventilation system of FIG. 6, in accordance with some embodiments of the present disclosure.

Referring to FIG. 7, a schematic diagram is provided illustrating a cooperative relationship 700 between the artificial intelligence platform 450 of FIG. 4 (750 in FIG. 7) and the ventilation system 620 (720 in FIG. 7). The tools shown herein include, but are not limited to, the digital twin manager 452 (752 in FIG. 7), including the digital twin prediction/simulation engine 454 (654 in FIG. 6) with the air flow simulation module 456 (756 in FIG. 7), and the air flow management module 458 (758 in FIG. 7) embedded therein. The artificial intelligence platform 750 receives data from a plurality of sources, each that will be discussed further in relation to FIGS. 8-9. The air flow simulation module 756 includes the algorithms and logic necessary to simulate the air flow through the structure 600. The air flow management module 758 includes the necessary algorithms and logic to direct the ventilation system 620 to perform the functions as described further herein based on the air flow simulations.

Figure 8:
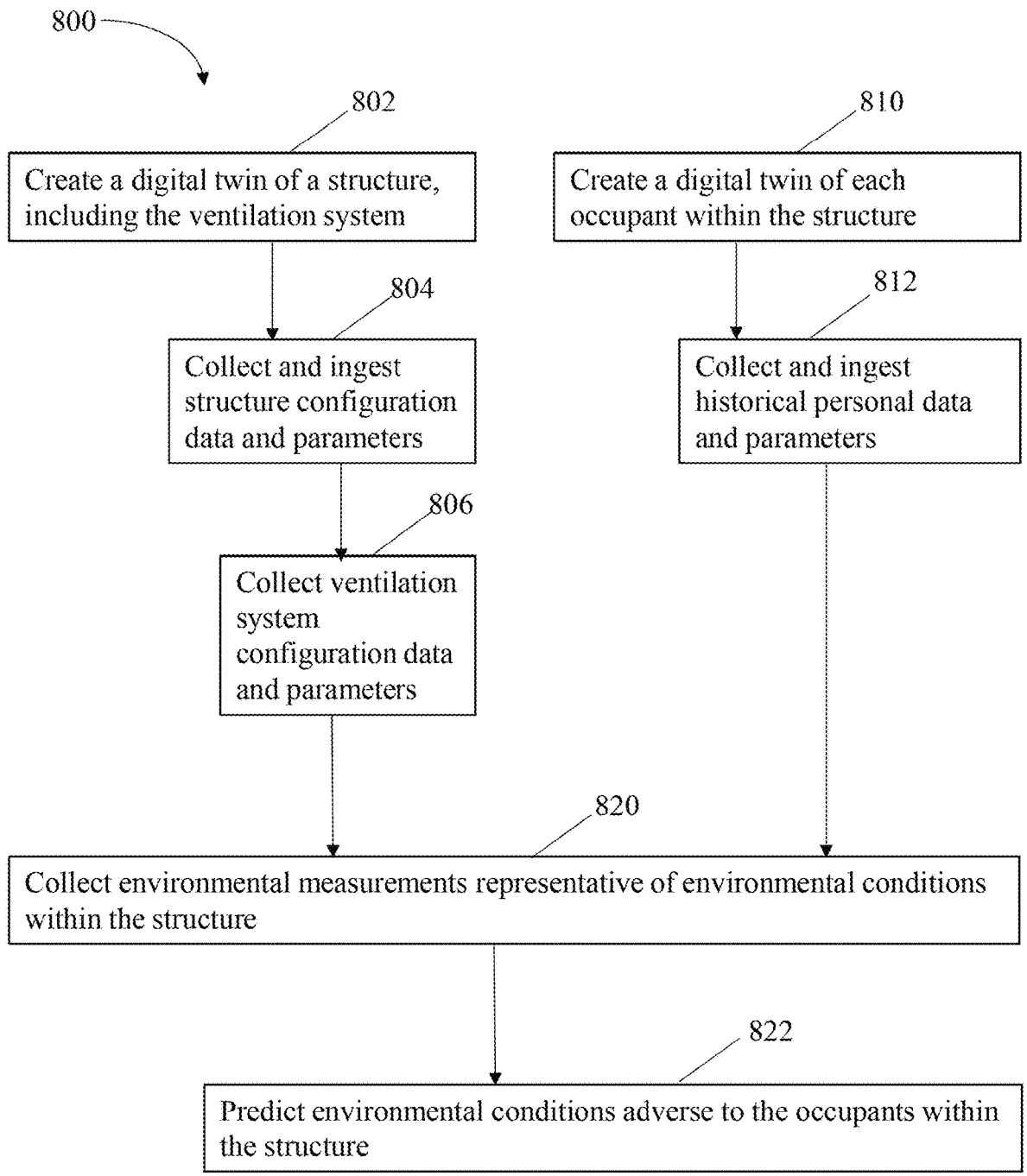
FIG. 8 is a flowchart of a process for creating a digital twin of the affected structure and digital twins of the evacuees, in accordance with some embodiments of the present disclosure.

Referring to FIG. 8, a flowchart is provided for a process 800 for creating a digital twin of the affected structure and digital twins of the evacuees, in accordance with some embodiments of the present disclosure. Also referring to FIGS. 6 and 7, a digital twin of the structure 600, including the ventilation system 620/720 is created 802. The training of the associated high-fidelity ML model that will represent the digital twin of the structure includes collection and ingestion 804, by the digital twin manager 752, documents maintained within a knowledge base directed toward the structure configuration data and parameters 702. In at least some embodiments, such ingested structure configuration data and parameters 702 include, without limitation, construction drawings, operation and maintenance manuals, and any other documentation that enables operation of the digital twin computing system 400 as described herein. In particular, the ingested structure configuration data and parameters 702 are associated with the windows 604A, 604B, 604C, 604D, and 604E (including air leakage therethrough), the exterior doors 606A and 606B (including air leakage therethrough), the interior doors 610A, 610B, 610C, 610D, 610E, and 610F (including air leakage therethrough), the passageways 612A, 612B, and 612C. the interior rooms 614A, 614B, 614C, 614D, 614E, and 614F, and the monitoring sensor devices 618. Furthermore, details with respect to those regions of the structure 600 that include potentially hazardous features, for example, and without limitation, glass features, pressurized gas cannisters, electrical switchgear, and chemical storage, are collected and ingested 804. The collected facility structure data 474 is stored in the digital twin database 473 within the knowledge base 170. The created digital twin of the structure 600 is resident within the high-fidelity ML model of the structure 600 that, in turn, is resident within the digital twin prediction/simulation engine 754 and is stored in the digital twin database 473. Accordingly, a high-fidelity digital twin of the structure 600 is created through collection and ingestion 804 of the known structure configuration data and parameters 702 and training the respective high-fidelity model using the machine learning features of the AI platform 750.

In addition, as a portion of the data collection and ingestion 804 for the digital twin prediction/simulation engine, ventilation system configuration data and parameters 704 are collected and injected 806 into the structural digital twin. Such data includes, without limitation, the flow characteristics and capacities of the ventilation fans 628A and 628B, ventilation ducts 646A, 646B, 646C, and 646D, and the exhaust conduit 666. Such ventilation system configuration data and parameters 704 further includes the physical positioning, orientation, and flow modulation features and characteristics of the external ventilation fan inlet dampers 630A and 630B, the ventilation fan inlet dampers 636A and 636B, the ventilation fan supply dampers 640A and 640B, the intake/discharge openings 662, and the duct flow control dampers 664. Furthermore, the ventilation system configuration data and parameters 704 also includes the number, positioning, ranges, sensors, and calibration data associated with each monitoring sensor devices 618. The collected ventilation system data 475 is stored in the digital twin database 473 within the knowledge base 470. Accordingly, the high-fidelity digital twin of the structure 600 includes features of the ventilations system 620/720 created through collection and ingestion 806 of the known ventilation system configuration data and parameters 704 and training the respective high-fidelity model using the machine learning features of the AI platform 750.

In at least some embodiments, the dynamic features of the ventilation system 620/720 and the structure 600 are recorded and injected into the digital twin prediction/simulation engine 754 as a portion of the known structure configuration data and parameters 702 and ventilation system configuration data and parameters 704. More specifically, empirical data is recorded by the measurement devices 618 within the structure 600 including one or more environmental measurements representative of one or more environmental conditions within the structure 600. The data is recorded for a full range of ventilation system 620/720 configurations, including normal operations and emergency operations. For example, and without limitation, air temperatures, air pressures, and air flow directions and speeds are recorded throughout the ventilation system 620/720 and the structure 600. Also, for example, atmosphere measurements associated with the movement of test substances that simulate smoke and/or other adverse environmental conditions as circulated by the ventilation system 620/720 during testing activities are recorded, including, without limitation, adverse environmental material densities and adverse environmental conditions movement directions and speed. In addition, additional capturing of historical air flow patterns inside the structure 600 in different configurations includes, without limitation, varying open/closed windows 604A-604E, the exterior doors 606A and 606B, the interior doors 610A-610F, running and idling ventilation fans 628A and 628B, the external ventilation fan inlet dampers 630A and 630B, the ventilation fan inlet dampers 636A and 636B, the ventilation fan supply dampers 640A and 640B, the intake/discharge openings 662, and the duct flow control dampers 664. Such configuration variations capture changes and differences of external-to-internal and internal-to-external air flows, including dynamic changes as the component configurations are changed. The collected ventilation system data 475 is stored in the digital twin database 473 within the knowledge base 470. Accordingly, the dynamic data associated with the ventilation system 620/720 and the structure 600 across a wide range of possible conditions is recorded and injected into the structural digital twin.

In one or more embodiments, in addition to the digital twin of the structure 600, including the ventilation system 620/720, a digital twin of each occupant 616A-616D of the plurality of occupants 616A-616D resident within the structure 600 is created 810 by the digital twin prediction/simulation engine 754. The digital twins of the occupants 616A-616D are resident within the respective high-fidelity occupant ML models, and, in some embodiments, each occupant in the structure has a corresponding digital twin. The occupant digital twins and the respective high-fidelity occupant ML models are resident within the digital twin prediction/simulation engine 754 and are stored in the digital twin database 473. Each occupant ML model is trained with historical occupant data and parameters 706 that is collected and ingested 812. The receipt of the historical occupant data and parameters 706 include, without limitation, historical occupant biometric and health data and the associated parameters for each respective occupant 616A-616D. Such physical health conditions data includes, without limitation, pregnancy, pacemakers, and advanced age, and mobility issues such as knee issues and wheelchair/walker/crutch requirements. In addition, the historical behavioral patterns of each respective occupant is ingested by the respective occupant ML models. Such behavioral parameters of the occupants 616A-616D include, without limitation, anxiety levels, and susceptibility to panic attacks. Sources for the behavioral parameters include, without limitation, professional evaluations and social media. The data used to generate the digital twins for the occupants will meet or exceed all respective privacy and confidentially laws and requirements. In addition to the individual occupants' health and mobility parameters, the number of occupants 616A-616D and their respective positions within the structure 600 are maintained in real-time, as well as behaviorally through determined routines for each respective occupant 616A-616D. The collected occupant data 476 is stored in the digital twin database 473 within the knowledge base 470. Accordingly, for each occupant 616A-616D, a respective digital twin is created 810 such that the occupants 616A-616D are simulated within the model through collection and ingestion 812 of historical occupant data and parameters 706.

In at least some embodiments, and as described above, measurement data indicative of the environmental conditions within and throughout the structure 600 is continuously collected 820. Mechanisms for collecting 820 the data of the environmental conditions within the structure 600 include, without limitation, installed sensors such as, the monitoring sensor devices 618, that include, without limitation, pressure sensors, temperature sensors, flow sensors, infrared sensors, cameras, smoke detectors, and carbon monoxide detectors. The aforementioned monitoring sensor devices 618 may be any combination of wired and wireless devices. In addition, such sensors may include Internet of Things (IoT) devices 492 (shown in FIG. 4), such as, and without limitation, mobile phones (including mobile phones 480), portable sensors (not shown) (e.g., portable carbon monoxide detectors), and position monitoring devices (not shown) borne by the occupants 616A-616D. The continuous collection 820 of the environmental data and storage of the environmental conditions data 477 within the digital twin database 473 facilitates creating historical environmental conditions measurement data 708 that is injected into the structural digital twin. In some embodiments, additional known environmental conditions data is injected into the structural digital twin, where the data originates with, without limitation, other facilities and other proven models. Accordingly, the structural digital twin includes known historical environmental conditions measurement data 708 that has been collected for a variety of conditions of the structure 600, including historical normal conditions and historical emergency conditions.

In some embodiments, the collecting 820 of environmental measurements representative of environmental conditions within the structure 600 by the monitoring sensor devices 618 include generation of real time environmental conditions measurement data 710. Based on the ingestion of the known historical environmental conditions measurement data 708, and the real time environmental conditions measurement data 710, the structural digital twin is trained to recognize the distinguishing environmental characteristics of normal environmental conditions and abnormal environmental conditions, including emergency environmental conditions. For example, and without limitation, the digital twin prediction/simulation engine 754 is trained to determine measurements that may be indicative of an incipient hazardous condition developing in real time. Therefore, the digital twin prediction/simulation engine 754 may predict 822 one or more environmental conditions adverse to one or more of the occupants 616A-616D within the structure 600. In some embodiments, such predicting activities include tracking the airflow movement direction inside the structure 600, and utilizing the knowledge the model was trained with, to predict how hazardous conditions, such as, without limitation, smoke 670, will be flowing. Specifically, the direction of smoke 670 movement inside the structure 600, and how the current environmental parameters inside the structure 600 is influencing the flow and direction of spread of smoke 670, are analyzed. In addition, the relative position of the emergency conditions causing the hazardous environment may be determined, e.g., without limitation, fire 672. Furthermore, the type and severity of the emergency conditions may be established. In addition to the collected environmental data by the monitoring sensor devices 618, other conditions indicative of a possible emergency include, without limitation, occupants' position monitoring devices that are configured to indicate a sudden change in direction, speed, and behavior of the occupants 616A-616D. Furthermore, activation of automatic sprinkler systems (not shown) by a different hazard response system (not shown) may be used to identify the nature and location of any hazardous conditions, including the magnitude and rate of growth or containment of the hazard. Accordingly, the structural ML model and the embedded structural digital twin are configured to predict 822 environmental conditions adverse to the occupants 616A-616D within the structure 600 through the digital twin prediction/simulation engine 754.

Figure 9:
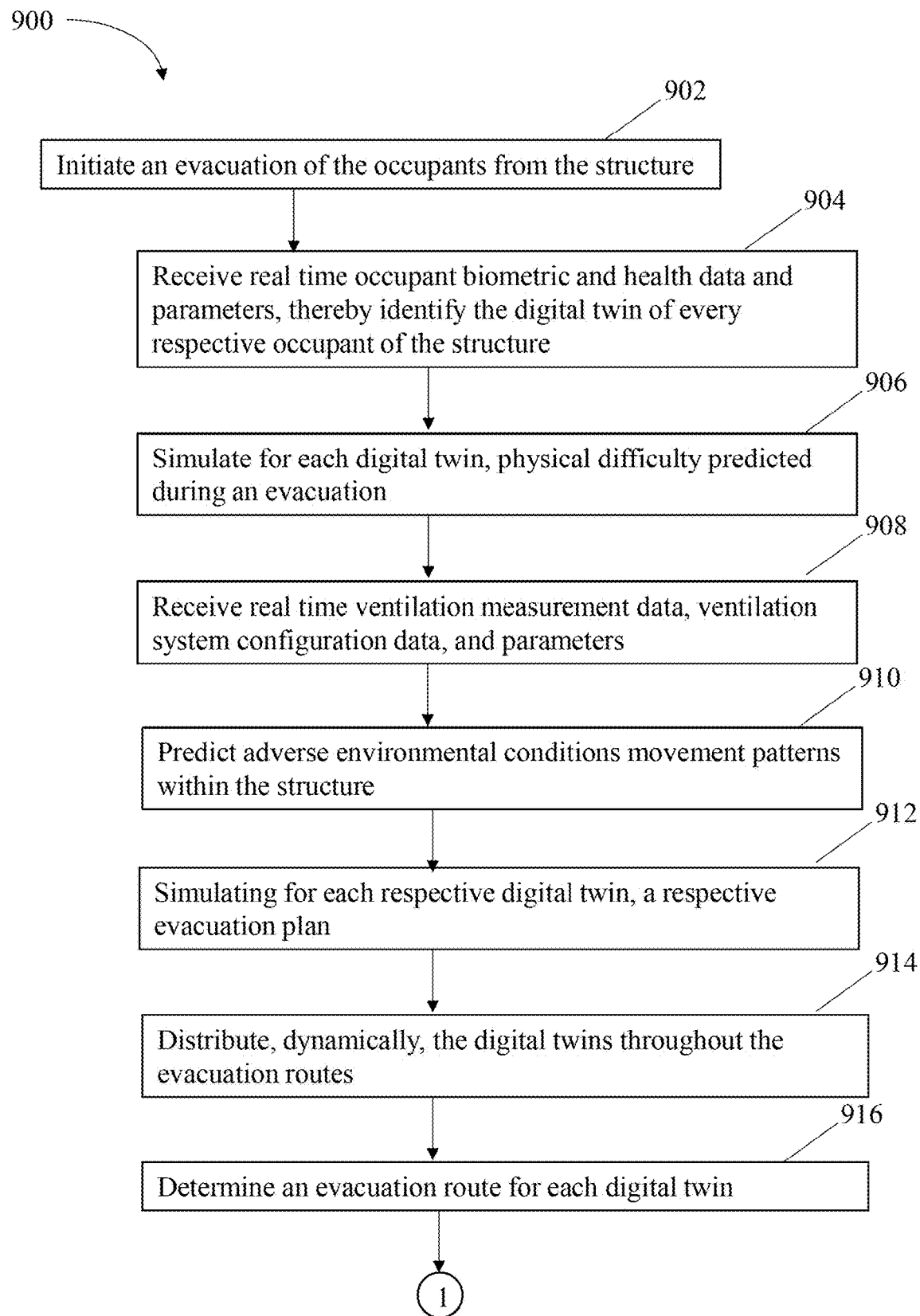
FIG. 9 is a flowchart of a process for evacuating occupants from the structure, in accordance with some embodiments of the present disclosure.
Figure 9:
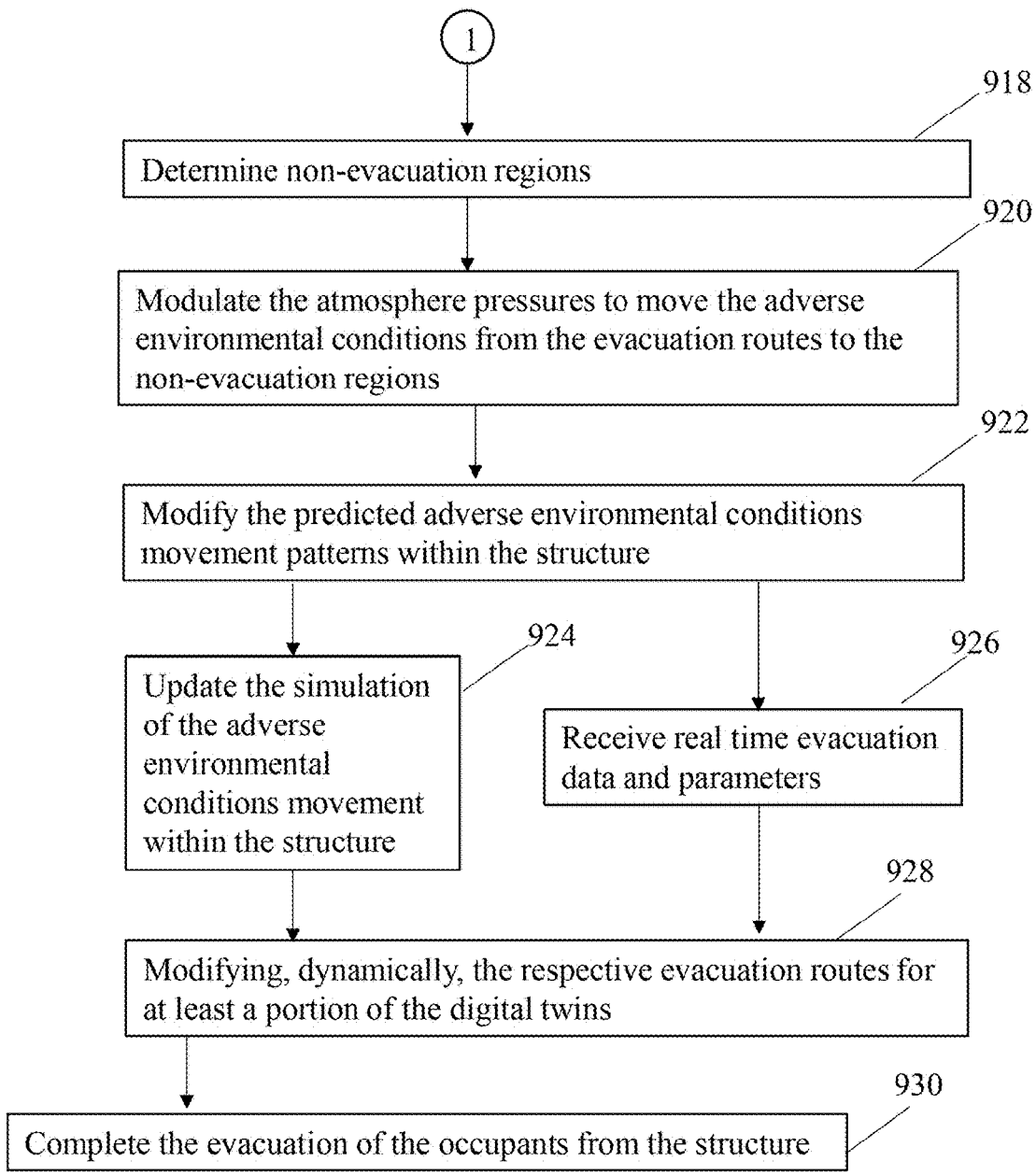

Referring to FIG. 9, a flowchart is provided for a process 900 for evacuating the occupants 616A-616D from the structure 600. Also, referring to FIGS. 6 and 7, prior to the present evacuation, in at least some embodiments, historical evacuation data and parameters 712 are recorded. For example, the digital twin prediction/simulation engine 754 captures the details associated with actual emergency evacuations and practice evacuations to determine best practices for future emergency evacuations. Such recorded data includes, without limitation, adverse environmental material densities and adverse environmental conditions movement directions and speeds as a function of the recorded respective ventilation system 620/720 configurations. Also, without limitation, for the various emergency conditions, the more effective, as well as the less effective, ventilation system 620/720 configurations are determined. Such configurations include, without limitation, the number of ventilation fans 628A and 628B providing forced supply draft 642 into the structure 600, the number of ventilation fans 628A and 628B providing removal draft 638 from the structure 600, and ventilation damper positions including, without limitation, positions of the external ventilation fan inlet dampers 630A and 630B, the ventilation fan inlet dampers 636A and 636B, the ventilation fan supply dampers 640A and 640B, and the duct flow control dampers 664. In some embodiments, the training of the digital twin prediction/simulation engine 454 is conducted on a continuous basis as unique conditions are presented. In some embodiments, recorded evacuation data from other sources may be imported and injected into the digital twin prediction/simulation engine 754. Accordingly, empirical data associated with the performance of the ventilation system 620/720 during actual and simulated emergencies is recorded and injected into the digital twin prediction/simulation engine 754.

As described in the previous embodiments, changing pressures can be performed with dampers and fans. While the discussion herein primarily relates to air intake fans with many dampers changing air flow (and therein pressure) to different regions, one of ordinary skill in the art would understand that in other examples a system may include a plurality of fans spread throughout a structure that may be individually modulated to change the pressure by themselves and/or in conjunction with respective dampers.

In one or more embodiments, the trained high-fidelity structural ML model, and the embedded structural digital twin, are created and placed into production through the digital twin prediction/simulation engine 754 to modulate the ventilation system 620/720 as a function of the measured conditions, including, without limitation, external environmental (e.g., weather) conditions, and existing and anticipated occupancy of the structure 600, including a room-by-room and passageway-by-passageway granularity. For example, and without limitation, room sensors may be able to discriminate between those rooms with no occupancy that may require less ventilation than those rooms with full occupancy that may require more ventilation. In some embodiments, the interior doors 610A, 610B, 610C, 610D, 610E, and 610F and the windows 604A, 604B, 604C, 604D, and 604E may be opened or closed automatically by the digital twin prediction/simulation engine 754 to modulate the draft in the structure 600.

In some embodiments, the accumulated knowledge, both historical and real time, may indicate to the digital twin prediction/simulation engine 754 a need to initiate 902 an evacuation of at least a portion of the occupants 616A-616D within the structure 600. Therefore, the digital twin prediction/simulation engine 754 receives 904 real time occupant evacuation, biometric, and health data and parameters 716, thereby identifying the digital twin of every respective occupant 616A-616D of the structure 600. In other words, the digital twins of each respective occupant are matched to the respective occupants 616A-616D presently known to be within the structure 600. Once the digital twin prediction/simulation engine 754 determines the occupants 616A-616D to be evacuated, and has matched the respective digital twins to the occupants 616A-616D, the digital twin prediction/simulation engine 754 simulates 906, through each respective digital twin, any physical difficulty that may have been previously predicted by the digital twin prediction/simulation engine 754 as likely to be manifested as a hinderance during an evacuation.

Referring to an embodiment where a fire 672 is located in the interior room 614A that is generating smoke 670 that is exiting into the passageway 612B through the respective open interior door 610A as indicated by the arrow 674. The fire 672 and smoke may be detected by the monitoring sensor devices 618 in the vicinity of the adverse conditions. The digital twin prediction/simulation engine 754 receives 908 real time ventilation measurement data, ventilation system configuration data, and parameters 718 such that the digital twin prediction/simulation engine 754 may predict 910, also based on the historical and other real time data, adverse environmental conditions movement patterns within the structure 600. In the example including the fire 672 and smoke 670, the smoke 670 may be predicted to migrate toward the passageway 612C, thereby filling the passageway 612B with smoke 670. Based on the available data, the digital twin prediction/simulation engine 754 simulates 912 for each respective occupant digital twin, a respective evacuation plan that is individualized for each occupant 616A-616D, taking into account the occupants' present location and their respective medical and behavioral conditions. In addition, the digital twin prediction/simulation engine 754 distributes 914, dynamically, the occupant digital twins throughout the evacuation routes such that the distribution of the occupants 616A-616D to be evacuated facilitates a safe, efficient, and effective evacuation.

In one or more embodiments, based on the evacuation route simulations. the digital twin prediction/simulation engine 754 may determine 916, for each of the occupants 616A-616D, one or more evacuation routes through the structure 600, including at least a first portion of the passageway 612B. In addition, based on the example scenario, the best evacuation route appears to be passageway 612B to passageway 612C an exit the structure 600 through the exterior door 606B. Furthermore, in anticipation of smoke clearing activities, the digital twin prediction/simulation engine 754 may determine 918 non-evacuation regions, for example, the passageway 612A. Therefore, the evacuation instructions will likely include not using the exterior door 606A to exit the structure 600.

In some embodiments, the evacuation routes may be created, at least partially subject to the aforementioned prediction and simulation, through the digital twin prediction/simulation engine 754 operating in conjunction with the ventilation system 620/720. In some embodiments, the digital twin prediction/simulation engine 754 operating in conjunction with the ventilation system 620/720 will maintain the established evacuation routes. Moreover, in some embodiments, these two features may overlap. To create the evacuation routes, the digital twin prediction/simulation engine 754 may modulate 920 the atmosphere pressures in the structure 600 to move the adverse environmental conditions from the evacuation routes to the non-evacuation regions. Specifically, in one or more embodiments, at least partially creating the one or more evacuation routes includes modulating one or more ventilation devices and inducing, subject to the ventilation devices' modulation, atmosphere pressure modulations within the one or more passageways, and in some cases, one or more rooms or enclosures within the structure. The modulations of the pressures throughout the various enclosures and passageways in the structure give rise to controlling the air flows therein. Therefore, the digital twin prediction/simulation engine 754 and the ventilation system 620/720 include the capabilities to dynamically control the direction of flow of smoke and breathable air to alter the air flow direction with positive and negative pressure gradients.

In at least some embodiments, subject to the evacuation route predictions and simulations, the digital twin prediction/simulation engine 754 will regulate the ventilation system 620/720 to modulate atmosphere pressures within the evacuation routes and non-evacuation regions. For example, and without limitation, the pressures in the evacuation routes may be increased and the pressures in the non-evacuation regions may be decreased to induce the smoke 670 to flow toward the non-evacuation regions from the evacuation routes. In the smoke 670 and fire 672 example, in one embodiment, duct damper 664A closes, thereby isolating the ventilation duct 646D from the ventilation fans 628A and 628B. The ventilation fan inlet dampers 636A and 636B for each respective ventilation fan 628A and 628B are closed and the ventilation fan supply dampers 640A and 640B for each respective ventilation fan 628A and 628B are open to induce the supply draft 642 into the ventilation duct 646C. The ventilation duct damper 664B is closed, thereby isolating the ventilation duct 646A from the ventilation fans 628A and 628B. The supply draft 642 is directed into the passageway 612C through the intake/discharge openings 662A and 662B via ventilation duct 646B to induce draft 676 into the passageway 612B. The air pressure in the vicinity of the intersection of the passageways 612C and 612B increases to push the smoke 670 through induced draft 678 toward the intake/discharge openings 662C and 662D into the ventilation duct 646D for exhaust through the exhaust conduit 666. In some embodiments, the ventilation duct damper 664A and the ventilation fan inlet dampers 636A and 636B may be modulated to decrease the air pressure in the vicinity of the intake/discharge openings 662C and 662D to increase the pressure gradient between the passageway 612C and the passageway 612A such that the occupants 616A-616D may evacuate the structure through the passageways 612B and 612C through the exterior door 606B. The local monitoring sensor devices 618 provide the real time information as to the effectiveness of the smoke removal efforts.

As the ventilation system 620/720 begins to alter the smoke 670 flow patterns in the structure 600, the real time data as described above continues to be received by the digital twin prediction/simulation engine 754 and the predicted adverse environmental conditions movement patterns within the affected portions of the structure are modified 922 based on the incoming data. In addition, subject to the modified predictions of the predicted adverse environmental conditions movement patterns, the simulation of the adverse environmental conditions movement within the affected portions of the structure 600 are modified. Accordingly, as the simulation is modified, the ventilation system 620/720 is operated to modulate the atmosphere pressures in the respective passageways 612A, 612B, and 612C to move at least a portion of the adverse environmental conditions from the evacuation routes (in the example, passageways 612C and 612B) to the non-evacuation regions (passageway 612A). Accordingly, real time ventilation measurement data, ventilation system configuration data, and the respective modified parameters are used to simulate and execute the evacuation plan.

In one or more embodiments, subject to the evacuation routes being determined and efforts towards clearing the evacuation routes of the adverse environmental conditions are initiated, such conditions facilitate an evacuation of the occupants 616A-616D from the affected portion of the structure 600. The digital twin prediction/simulation engine 754, i.e., the digital twins of the occupants 616A-616D continue receive real time occupant biometric and health data and parameters 714. Based on the nature of the adverse environmental conditions, and the historical data and parameters of the occupants used to create the respective occupant digital twins, for each digital twin, respective physical difficulties that are predicted for the evacuation are simulated. Such simulated physical difficulties may include one or more of discomfort during movement, or inability to walk or run, low speed of movement, and necessity for assistance with a wheelchair. In addition, for each respective occupant digital twin, an evacuation plan is continuously dynamically simulated. The simulated evacuation plan is based on the individualized evacuation plan for each respective digital twin, where the evacuation routes are dynamically assigned to the respective digital twins, thereby efficiently and effectively orchestrating the evacuation to avoid overcrowding of any of the evacuation routes.

The simulated evacuation plan is at least partially further based on a simulated population capacity of each evacuation route, the predicted populations and population densities at each emergency exit, predicted changes in populations at each emergency exit and along the evacuation routes as a function of real time feedback of the number of occupants in transit. In addition, the simulated evacuation plan is at least partially further based on the changes in the emergency conditions, the period of time estimated for each in transit occupant to arrive at each respective emergency exit based on their measured rate of progress through the evacuation route and known medical infirmities, and actual real time changes in populations in the evacuation routes and at each emergency exit through feedback from an arrival at each emergency exit of the in transit occupants, and real-time changes to the number of in transit occupants within the evacuation routes directed toward the respective emergency exits. Accordingly, real time evacuation data and respective parameters and real time occupant data and parameters are used to orchestrate the evacuation through updating 924 the simulation of the adverse environmental conditions movement within the structure 600.

To facilitate the evacuation, each individual occupant receives personalized guidance with virtual assistance, including, without limitation, voice instructions through a speaker system of a portable device, such as a mobile phone 480, subject to the limitations of the respective occupants 616A-616D. As the occupants 616A-616D are observed traversing the assigned evacuation routes, through the aforementioned tracking and sensing devices, real time evacuation data and parameters 716 are received 926 by the respective digital twins. Such real time feedback of the occupants 616A-616D, the emergency conditions, and the ventilation system 620/720 results in dynamically modifying 928 the respective evacuation routes for at least a portion of the digital twins, if necessary. The simulation of the ventilation system 620/720 will also be updated as the evacuation progresses, and the feedback from the ventilation system devices will be used to simulate the updating of the occupant digital twins. Accordingly, the evacuation will continue to be predicted and simulated through the structural ML digital twin and the occupants' ML digital twins until the evacuation of the occupants 616A-616D from the structure 600 completes 930.

The system, computer program product, and method as disclosed herein significantly improve the evacuation process of occupants from a structure. The improvement includes creation of a digital twin of the structure through machine learning techniques. Similarly, a digital twin of each occupant is created through machine learning techniques. The digital twins are used to create an end-to-end simulation of an evacuation from the building considering the building infrastructure, including the ventilation system. The digital twins of the occupants are built with details of each of the occupants including health parameters of the occupants. In addition, real time and dynamic changes to the status of the structure, ventilation system, and occupants are monitored and the simulation of the evacuation is modified as a function of the real time data. The digital twin prediction-simulation and feedback to the digital twins from the real-world actions facilitates creating and orchestrating an effective evacuation plan, where the occupants are evacuated in a personalized manner.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
    a server comprising at least one processing device and at least one memory device operably coupled to the at least one processing device; and
    a ventilation system communicatively coupled to the server, the ventilation system and the server cooperatively configured to:
        determine one or more environmental conditions adverse to one or more occupants within a structure at least partially enclosing a ventilation system and one or more passageways therein;
        predict movement patterns of the one or more adverse environmental conditions within at least a portion of the structure;
        create, at least partially subject to the predicting, one or more evacuation routes including at least a first portion of the one or more passageways; and
        modulate, through the ventilation system, atmosphere pressures in one or more respective passageways to move at least a portion of the adverse environmental conditions from the one or more evacuation routes to one or more non-evacuation regions.

2. The system of claim 1, the ventilation system and the server further cooperatively configured to:
    collect one or more environmental measurements representative of the one or more adverse environmental conditions within the structure.

3. The system of claim 1, wherein the system is a cognitive system, the cognitive system is configured to:
    determine, subject to the one or more adverse environmental conditions determination, the one or more non-evacuation regions of the structure including at least a second portion of the one or more passageways; and
    modulate atmosphere pressures within the one or more non-evacuation regions.

4. The system of claim 3, wherein the cognitive system is an artificial intelligence (AI) platform, the system further comprising:
    the AI platform resident within the server, the AI platform in operable communication with at least a portion of the ventilation system, the AI platform comprising:
        a digital twin prediction and simulation engine configured to:
            simulate, subject to the prediction, the adverse environmental conditions movement within the at least a portion of the structure; and
            perform the modulating.

5. The system of claim 4, the ventilation system comprising:
    one or more atmosphere pressure measurement devices communicatively coupled to the digital twin prediction and simulation engine; and
    one or more ventilation air moving devices operably coupled to the digital twin prediction and simulation engine, the one or more ventilation air moving devices modulated through the digital twin prediction and simulation engine, wherein the modulation of the one or more ventilation air moving devices induces the atmosphere pressure modulations within the one or more passageways, thereby at least partially creating the one or more evacuation routes.

6. The system of claim 5, the ventilation system and the digital twin prediction and simulation engine further cooperatively configured to:
    record, through the one or more atmosphere pressure measurement devices, real time ventilation measurement data;
    modify, subject to the recorded real time ventilation measurement data, the predicted adverse environmental conditions movement patterns within the at least a portion of the structure;
    update, subject to the modified prediction, the simulation of the adverse environmental conditions movement within the at least a portion of the structure; and
    modulate, through the one or more ventilation air moving devices, subject to the updated adverse environmental conditions movement simulation, the atmosphere pressures in one or more respective passageways to move at least a portion of the adverse environmental conditions from the one or more evacuation routes to the one or more non-evacuation regions.

7. The system of claim 6, wherein, for each of the one or more passageways, the real time ventilation measurement data comprises:
- one or more real time atmosphere pressures;
- one or more real time atmosphere temperatures;
- one or more real time adverse environmental material densities; and
- one or more real time adverse environmental conditions movement directions and speed.

8. The system of claim 4, the digital twin prediction and simulation engine further configured to:
- create a digital twin of each respective occupant of the one or more occupants through receipt of one or more of:
  - historical occupant biometric and health data and parameters for each respective occupant of the one or more occupants; and
  - historical behavioral patterns of each respective occupant of the one or more occupants.

9. The system of claim 8, the digital twin prediction and simulation engine further configured to:
- facilitate an evacuation of the one or more occupants from the at least a portion of the structure comprising:
  - receive real time occupant biometric and health data and parameters, thereby identify the digital twin of every respective occupant of the one or more occupants;
  - simulate, for each digital twin, at least partially subject to the environmental conditions adverse to the one or more occupants within the structure, physical difficulty predicted during the evacuation;
  - simulate for each respective digital twin, subject to the modulation of the atmosphere pressures within the one or more evacuation routes, a respective evacuation plan;
  - distribute, dynamically, the digital twins throughout the one or more evacuation routes;
  - determine, at least partially subject to the distribution, an evacuation route for each digital twin;
  - receive real time evacuation data and parameters; and
  - modify, dynamically, subject to the real time evacuation data and parameters, the respective evacuation routes for at least a portion of the digital twins.

10. A computer program product comprising:
one or more computer readable storage media; and
program instructions collectively stored on the one or more computer storage media, the program instructions comprising:
- program instructions to determine one or more environmental conditions adverse to one or more occupants within a structure at least partially enclosing a ventilation system and one or more passageways therein;
- program instructions to predict movement patterns of the one or more adverse environmental conditions within at least a portion of the structure;
- program instructions to create, at least partially subject to the predicting, one or more evacuation routes including at least a first portion of the one or more passageways; and
- program instructions to modulate, through the ventilation system, atmosphere pressures in one or more respective passageways to move at least a portion of the adverse environmental conditions from the one or more evacuation routes to one or more non-evacuation regions.

11. The computer program product of claim 10, further comprising:
- program instructions to determine, subject to the one or more adverse environmental conditions determination, the one or more non-evacuation regions of the structure including at least a second portion of the one or more passageways;
- program instructions to modulate atmosphere pressures within the one or more non-evacuation regions;
- program instructions to predict adverse environmental conditions movement patterns within the at least a portion of the structure; and
- program instructions to simulate, subject to the prediction, the adverse environmental conditions movement within the at least a portion of the structure.

12. The computer program product of claim 11, further comprising:
- program instructions to create a digital twin of each respective occupant of the one or more occupants through receipt of one or more of:
  - historical occupant biometric and health data and parameters for each respective occupant of the one or more occupants; and
  - program instructions to historical behavioral patterns of each respective occupant of the one or more occupants;
- program instructions to facilitate an evacuation of the one or more occupants from the at least a portion of the structure comprising:
  - program instructions to receive real time occupant biometric and health data and parameters, thereby identify the digital twin of every respective occupant of the one or more occupants;
  - program instructions to simulate, for each digital twin, physical difficulty predicted during the evacuation;
  - program instructions to simulate for each respective digital twin, a respective evacuation plan;
  - program instructions to distribute, dynamically, the digital twins throughout the one or more evacuation routes;
  - program instructions to determine, at least partially subject to the distribution, an evacuation route for each digital twin;
  - program instructions to receive real time evacuation data and parameters; and
  - program instructions to modify, dynamically, subject to the real time evacuation data and parameters, the respective evacuation routes for at least a portion of the digital twins.

13. A computer-implemented method for facility evacuation comprising:
- determining one or more environmental conditions adverse to one or more occupants within a structure at least partially enclosing a ventilation system and one or more passageways therein;
- predicting movement patterns of the one or more adverse environmental conditions within at least a portion of the structure;
- creating, at least partially subject to the predicting, one or more evacuation routes including at least a first portion of the one or more passageways; and
- modulating, through the ventilation system, atmosphere pressures in one or more respective passageways to move at least a portion of the adverse environmental conditions from the one or more evacuation routes to one or more non-evacuation regions.

14. The method of claim 13, further comprising:
collecting one or more environmental measurements representative of the one or more adverse environmental conditions within the structure.

15. The method of claim 13, further comprising:
determining, subject to the one or more adverse environmental conditions determination, the one or more non-evacuation regions of the structure including at least a second portion of the one or more passageways;
modulating atmosphere pressures within the one or more non-evacuation regions; and
simulating, subject to the prediction, the adverse environmental conditions movement within the at least a portion of the structure.

16. The method of claim 15, wherein at least partially creating the one or more evacuation routes comprises:
modulating one or more ventilation air moving devices; and
inducing, subject to the ventilation air moving devices modulation, the atmosphere pressure modulations within the one or more passageways.

17. The method of claim 16, further comprising:
recording, through one or more atmosphere pressure measurement devices, real time ventilation measurement data;
modifying, subject to the recorded real time ventilation measurement data, the predicted adverse environmental conditions movement patterns within the at least a portion of the structure;
updating, subject to the modified prediction, the simulation of the adverse environmental conditions movement within the at least a portion of the structure; and
modulating, through the one or more ventilation air moving devices, subject to the updated adverse environmental conditions movement simulation, the atmosphere pressures in one or more respective passageways to move at least a portion of the adverse environmental conditions from the one or more evacuation routes to the one or more non-evacuation regions.

18. The system of claim 17, wherein recording the real time ventilation measurement data comprises:
recording one or more real time atmosphere pressures;
recording one or more real time atmosphere temperatures;
recording one or more real time adverse environmental material densities; and
recording one or more real time adverse environmental conditions movement directions and speed.

19. The method of claim 14, further comprising:
creating a digital twin of each respective occupant of the one or more occupants, comprising:
receiving historical occupant biometric and health data and parameters for each respective occupant of the one or more occupants; and
receiving historical behavioral patterns of each respective occupant of the one or more occupants.

20. The method of claim 19, further comprising:
facilitating an evacuation of the one or more occupants from the at least a portion of the structure comprising:
receiving real time occupant biometric and health data and parameters, thereby identify the digital twin of every respective occupant of the one or more occupants;
simulating, for each digital twin, at least partially subject to the environmental conditions adverse to the one or more occupants within the structure, physical difficulty predicted during the evacuation;
simulating for each respective digital twin, subject to the modulation of the atmosphere pressures within the one or more evacuation routes, a respective evacuation plan;
distributing, dynamically, the digital twins throughout the one or more evacuation routes;
determining, at least partially subject to the distribution, an evacuation route for each digital twin;
receiving real time evacuation data and parameters; and
modifying, dynamically, subject to the real time evacuation data and parameters, the respective evacuation routes for at least a portion of the digital twins.

* * * * *